(12) United States Patent
Kitamura

(10) Patent No.: US 6,767,308 B2
(45) Date of Patent: Jul. 27, 2004

(54) METHOD OF CONTROLLING BICYCLE ASSEMBLY

(75) Inventor: Satoshi Kitamura, Nara (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 09/907,571

(22) Filed: Jul. 19, 2001

(65) Prior Publication Data

US 2002/0128106 A1 Sep. 12, 2002

Related U.S. Application Data

(60) Provisional application No. 60/274,235, filed on Mar. 9, 2001.

(51) Int. Cl.[7] .................. B62D 61/02; B62K 11/00; B62M 7/00; B62M 1/02
(52) U.S. Cl. .................. 477/7; 477/906; 280/259; 180/220
(58) Field of Search ............... 477/7, 15, 906, 477/907; 280/276, 284, 5.5–5.52, 236–238, 259–261; 180/218–221, 65.3

(56) References Cited

U.S. PATENT DOCUMENTS

| | | | | |
|---|---|---|---|---|
| 4,558,264 A | * | 12/1985 | Weischedel, deceased .. | 318/138 |
| 4,952,196 A | * | 8/1990 | Chilcote et al. ............. | 474/70 |
| 5,079,583 A | * | 1/1992 | Sato et al. .................. | 396/235 |
| 5,324,058 A | * | 6/1994 | Massaro ..................... | 280/283 |
| 5,681,234 A | * | 10/1997 | Ethington ................... | 474/70 |
| 5,708,343 A | * | 1/1998 | Hara et al. ................. | 318/139 |
| 5,798,702 A | * | 8/1998 | Okamoto et al. ........... | 180/220 |
| 5,857,537 A | * | 1/1999 | Matsumoto et al. ........ | 180/205 |
| 5,910,714 A | * | 6/1999 | Buchanan et al. .......... | 180/206 |
| 5,937,962 A | * | 8/1999 | Yokoyama .................. | 180/205 |
| 5,971,116 A | * | 10/1999 | Franklin .................. | 188/282.4 |
| 6,050,583 A | | 4/2000 | Bohn | |
| 6,153,993 A | * | 11/2000 | Oomura et al. ............. | 318/434 |
| 6,247,548 B1 | * | 6/2001 | Hayashi et al. ............. | 180/206 |
| 6,278,216 B1 | * | 8/2001 | Li ............................... | 310/254 |
| 6,296,072 B1 | * | 10/2001 | Turner ....................... | 180/205 |
| 6,431,573 B1 | * | 8/2002 | Lerman et al. ............. | 280/261 |
| 6,443,032 B1 | | 9/2002 | Fujii et al. | |
| 6,543,799 B2 | * | 4/2003 | Miyoshi ..................... | 280/283 |
| 6,698,780 B2 | * | 3/2004 | Miyoshi ..................... | 280/276 |
| 2001/0026147 A1 | * | 10/2001 | Nakashimo | |

FOREIGN PATENT DOCUMENTS

| | | | | |
|---|---|---|---|---|
| EP | 0697332 | * | 2/1996 | .......... B62M/23/02 |
| EP | 1310423 A2 | * | 5/2003 | .......... B62M/25/08 |
| JP | 58-186741 U | | 12/1983 | |
| JP | 59-59087 A | | 4/1984 | |
| JP | 60-98236 A | | 6/1985 | |
| JP | 01-73481 U | | 5/1989 | |
| JP | 03-37056 B2 | | 6/1991 | |
| JP | 05-30767 A | | 2/1993 | |
| JP | 05-66838 A | | 3/1993 | |
| JP | 408058668 | * | 3/1996 | .......... B62M/23/02 |
| JP | 08-223953 A | | 8/1996 | |
| JP | 08-251982 A | | 9/1996 | |
| JP | 09-47051 A | | 2/1997 | |
| JP | 2544005 Y2 | | 5/1997 | |
| JP | 09-256428 A | | 9/1997 | |
| JP | 2727497 B2 | | 12/1997 | |
| JP | 10-285005 A | | 10/1998 | |
| JP | 2852142 B2 | | 11/1998 | |
| JP | 11-122961 A | | 4/1999 | |
| JP | 3069612 U | | 3/2000 | |

* cited by examiner

*Primary Examiner*—Tisha D Lewis
(74) *Attorney, Agent, or Firm*—Shinjyu Global IP Counselors, LLP

(57) ABSTRACT

A simplified method is provided for controlling a motor of a bicycle component, especially a power assisting apparatus for a derailleur or a suspension. The method of controlling a motor of a bicycle assembly, basically comprising the steps of supplying current to the motor to move a bicycle component between a first position and a second position, and monitoring current flow to the motor during movement of the bicycle component. Then, stopping flow of current to the motor upon detection of an overcurrent to the motor due to the bicycle component reaching one of the first and second positions after being driven from the other of the first and second positions.

24 Claims, 17 Drawing Sheets

METHOD OF CONTROLLING BICYCLE ASSEMBLY

CROSS-REFERENCE TO RELATED APPLICATION

This application claims the benefit of U.S. Provisional Patent Application Serial No. 60/274,235, filed Mar. 9, 2001. The entire disclosure of U.S. Provisional Patent Application Serial No. 60/274,235 is hereby incorporated herein by reference.

BACKGROUND OF THE INVENTION

1. Field of the Invention

This invention generally relates to a bicycle transmission. More specifically, the present invention relates controlling a motor of a bicycle component used in a bicycle transmission.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One part of the bicycle that has been extensively redesigned is the transmission or drive train of the bicycle. Specifically, manufacturers of bicycle components have been continually improving shifting performance of the various shifting components such as the shifter, the shift cable, the derailleur, the chain and the sprocket.

Recently, bicycles have been provided with an electronic drive train for smoother shifting. These electronic drive trains include a rear multi-stage sprocket assembly with a motorized rear derailleur and a front multi-stage sprocket assembly with a motorized front derailleur. These derailleurs are electronically operated by a cycle computer for automatically and/or manually shifting of the derailleurs.

A typical bicycle transmission is operated by a shift operating wire connected between the transmission and a manually operated shift operating device mounted on the handlebar. The rider operates the shift operating device to selectively pull or release the shift operating wire which, in turn, operates the transmission in the desired manner.

One of the goals of bicycle transmission design is to make the transmission easy to operate with a minimum amount of effort. This involves minimizing the force needed to operate the shift operating device as well as minimizing the amount of unnecessary movement of the shift operating device. In the case of bicycle transmissions such as derailleurs which are used to shift a chain from one sprocket and move it to another can be quite large, especially when the destination sprocket is substantially larger than the originating sprocket and the rider is exerting substantial pedaling force on the chain. The necessary operating force can be reduced by operating the shift operating device when only a small pedaling force is being applied to the chain, but that requires the rider to consciously alter his or her pedaling technique and/or consciously operate the shift operating device only when a small pedaling force is being applied to the chain. That can be very distracting, especially in a racing environment. Also, the actuation of ratio of some derailleurs may be somewhat large. Consequently, the shift operating wire must move a substantial distance to fully move the chain from one sprocket to another, thus requiring the rider to move the shift operating device by a correspondingly large amount.

In view of the above, there exists a need for a bicycle transmission which overcomes the above mentioned problems in the prior art. This invention addresses this need in the prior art as well as other needs, which will become apparent to those skilled in the art from this disclosure.

SUMMARY OF THE INVENTION

One object of the present invention is to provide a simplified method of controlling a motor of a bicycle component.

Another object of the present invention is to provide a power assist for a front derailleur.

The foregoing objects can basically be attained by providing a method of controlling a motor of a bicycle assembly, comprising the steps of supplying current to the motor to move a bicycle component between a first position and a second position; monitoring current flow to the motor during movement of the bicycle component; and stopping flow of current to the motor upon detection of an overcurrent to the motor due to the bicycle component reaches one of the first and second positions after being driven from the other of the first and second positions.

The foregoing objects can also be attained by providing a bicycle assembly, comprising a motor having an overcurrent detecting circuit operatively coupled to a power input line of the motor to interrupt current flow to the motor upon detection of an overcurrent; and a bicycle component operatively coupled to the motor to move the bicycle component between a first position and a second position such that the overcurrent occurs in the motor when the bicycle component reaches one of the first and second positions after being driven from the other of the first and second positions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
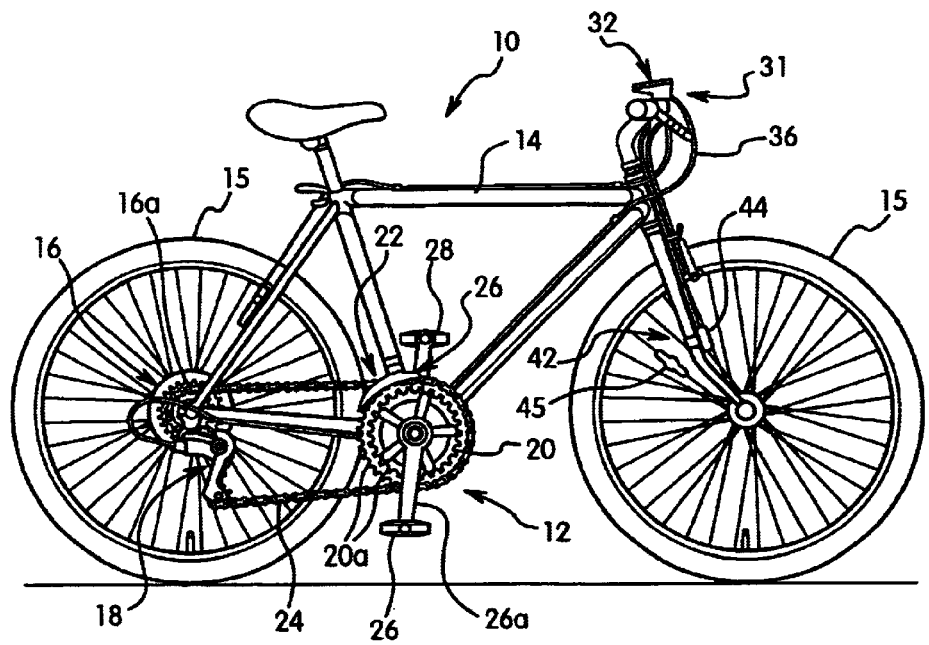
FIG. 1 is a side elevational view of a conventional bicycle with an electronically controlled drive train in accordance with a first embodiment of the present invention.
Figure 2:
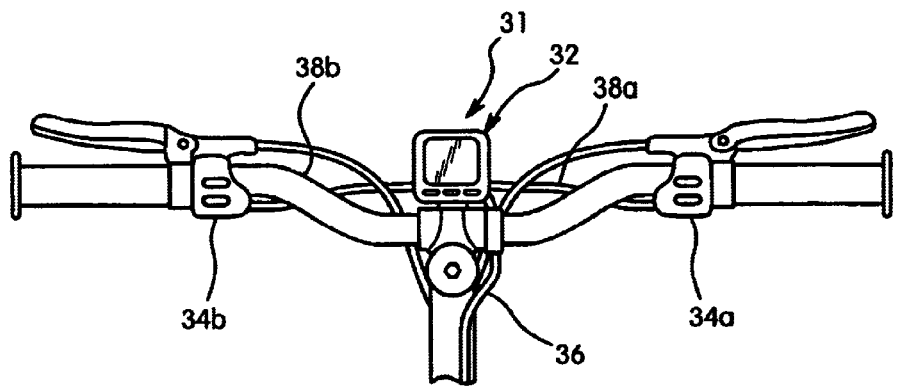
FIG. 2 is a top plan view of the handlebar portion of the bicycle illustrated in FIG. 1 with a shift control unit and a pair of shifting devices coupled thereto.
Figure 3:
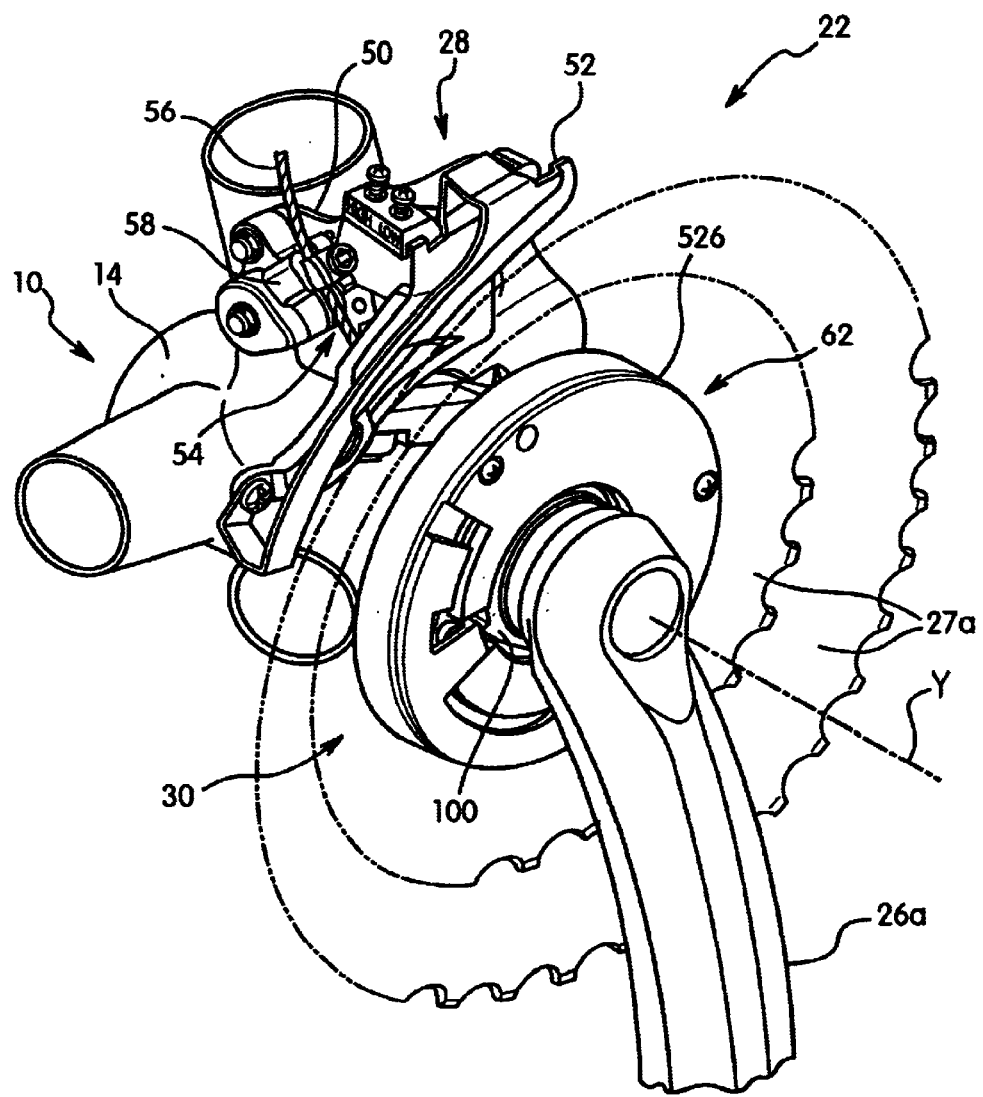
FIG. 3 is a perspective view of the front derailleur assembly that incorporates a shift assisting apparatus according to the present invention for shifting a bicycle transmission or drive train.

Referring initially to FIGS. 1–3, a bicycle 10 is illustrated with an electronically controlled drive train 12 in accordance with a first embodiment of the present invention, as discussed below. The bicycle 10 basically has a frame 14 and a pair of wheels 15, with the rear wheel being driven by the drive train 12. The bicycle 10 and its various components are well known in the prior art, except for the improved portions of the drive train 12 of the present invention. Thus, the bicycle 10 and its various components will not be discussed or illustrated in detail herein, except for the components that relate to the drive train 12 of the present invention. Moreover, various conventional bicycle parts such as brakes, additional sprockets, etc., which are not illustrated and/or discussed in detail herein, can be used in conjunction with the present invention.

As used herein, the terms "forward, rearward, upward, above, downward, below and transverse" refer to those directions of a bicycle in its normal riding position. Accordingly, these terms, as utilized to describe the present invention in the claims, should be interpreted relative to bicycle 10 in its normal riding position.

Still referring to FIGS. 1–3, the drive train 12 basically includes a rear multi-stage sprocket assembly 16 with a motorized rear derailleur assembly or chain shifting device 18, a front multi-stage sprocket assembly 20 with a motorized front derailleur assembly or chain shifting device 22, a chain 24 extending between the rear multi-stage sprocket assembly 16 and the front multi-stage sprocket assembly 20, and a pair of pedals 26 mounted on a bottom bracket 27 to rotate the front multi-stage sprocket assembly 20. The rear multi-stage sprocket assembly 16 has a plurality of sprockets or gears 16a that are arranged in a conventional manner. The front multi-stage sprocket assembly 20 has a plurality of sprockets or gears 20a that are arranged in a conventional manner. In the illustrated embodiment, the front multi-stage sprocket assembly 20 has two sprockets or gears 20a.

The front derailleur assembly 22 basically includes a front derailleur 28 and a shift assisting apparatus 30. The front derailleur 28 is preferably a conventional front derailleur that is cable operated. An electronic control system 31 basically operates the shift assisting apparatus 30, which in turn operates the front derailleur 28. The shift assisting apparatus 30 utilizes power from the drive train 12 to move the front derailleur 28 between a first shift position and a second shift position as explained below in more detail.

The electronic control system 31 basically includes a shift control unit or cycle computer 32 and a pair of shifting devices 34a and 34b. The shift control unit 32 is electrically coupled to the motorized derailleur assemblies 18 and 22 by an electrical control cord 36. The shift control unit 32 is also electrically coupled to the shifting devices 34a and 34b via the electrical cords 38a and 38b, respectively. It will be apparent to those skilled in the art from this disclosure, the electronic control system 31 can also be utilized to control other electronically operated components such as the front and rear suspension and/or other components of the bicycle.

The shift control unit or cycle computer 32 preferably includes a microcomputer formed on a printed circuit board that is powered by a battery unit. The microcomputer of the shift control unit 32 includes a central processing unit (CPU), a random access memory component (RAM), a read only memory component (ROM), and an I/O interface. The various components of the microcomputer are well known in the bicycle field. Therefore, the components used in the microcomputer of the shift control unit 32 will not be discussed or illustrated in detail herein. Moreover, it will be apparent to those skilled in the art from this disclosure that the shift control unit 32 can include various electronic components, circuitry and mechanical components to carryout the present invention. Of course, it will be apparent to those skilled in the art from this disclosure that the shift control unit 32 can have a variety of configurations, as needed and/or desired.

Preferably, the shift control unit 32 is a cycle computer that provides or displays various information to the rider via a display and that operates the motorized derailleur assemblies 18 and 22. Thus, the drive train 12 of the bicycle 10 is operated or electronically controlled by the shift control unit 32. More specifically, the shift control unit 32 is a cycle computer that electrically operates the motorized derailleur assemblies 18 and 22 either automatically or manually as explained below. One example of an automatic shifting assembly that can be adapted to be used with the present invention is disclosed in U.S. Pat. No. 6,073,061 to Kimura, which is assigned to Shimano Inc.

In the manual mode, shifting of each of the motorized derailleur assemblies 18 and 22 is preformed by via manually shifting the shift devices 34*a* and 34*b*. Depressing one of the shift buttons of the shift devices 34*a* and 34*b* generates a predetermined operational command that is received by the central processing unit of the shift control unit 32. The central processing unit of the shift control unit 32 then sends a predetermined operational command or electrical signal to move or shifting one of the motorized derailleur assemblies 18 and 22.

In the automatic mode, shifting of each of the motorized derailleur assemblies 18 and 22 is preferably at least partially based on the speed of the bicycle. Thus, the shift control unit 32 further includes at least one sensing/measuring device or component 42 that provides information indicative of the speed of the bicycle 10 to its central processing unit of the shift control unit 32. The sensing/measuring component 42 generates a predetermined operational command indicative of the speed of the bicycle 10. Of course, additional sensing/measuring components can be operatively coupled to central processing unit of the shift control unit 32 such that predetermined operational commands are received by the central processing unit (CPU) of the shift control unit 32 to operate the motorized derailleur assemblies 18 and 22 or other components.

The sensing/measuring component 42 can be, for example, a speed sensing unit that includes a sensor 44 and a magnet 45. The sensor 44 is preferably a magnetically operable sensor that is mounted on the front fork of the bicycle 10 and senses the magnet 45 that is attached to one of the spokes of the front wheel of the bicycle 10. The sensor 44 can be a reed switch or other component for detecting the magnet 45. Sensor 44 generates a pulse each time wheel of the bicycle 10 has turned a pre-described angle or rotation. In other words, the sensor 44 detects the rotational velocity of the front wheel of the bicycle 10. As soon as sensor 44 generates the pulse or signal, a pulse signal transmission circuit sends this pulse signal to the central processing unit of the shift control unit 32 to determine whether the chain 24 should be up shifted or down shifted. Thus, the sensor 44 and the magnet 45 form a sensing device or measuring component of the shift control unit 32. In other words, the sensor 44 outputs a bicycle speed signal by detecting a magnet 45 mounted on the front wheel of the bicycle 10. Thus, speed information is sent to the battery operated electronic shift control unit 32 to operate the motorized derailleur assemblies 18 and 22.

Referring to FIG. 3, the front derailleur 28 fixedly coupled to the bottom bracket 27 of the bicycle frame 14. While the front derailleur 28 is illustrated as being fixedly coupled to the bottom bracket 27*b* of the bicycle frame 14, it will be apparent to those skilled in the art from this disclosure that front derailleur 28 can be coupled to other parts of the bicycle such as the seat post as needed and/or desired. The front derailleur 28 is operated by the shift control unit 32 to move the chain 24 between sprockets 22*a*. More specifically, the rider pushes one of the buttons on the shifting devices 34*b* that activates the shift assisting apparatus 30 which in turn moves the front derailleur 28 between its shift positions.

Still referring to FIG. 3, the front derailleur 28 basically includes a fixed mounting member 50, a chain guide 52 and a linkage assembly 54 coupled between fixed member 50 and chain guide 52. A cable 56 or wire is fixedly coupled between the shift assisting apparatus 30 and an operating arm or lever 58 of the linkage assembly 54. Thus, the shift assisting apparatus 30 operates the front derailleur 28 by pulling or releasing the operating wire 56 to move the chain guide 52 from a retracted (low gear) position to an extended (high gear) position. Linkage assembly 54 is preferably designed such that a biasing member (torsion spring) normally biases chain guide 52 in a transverse direction towards the frame 14 of bicycle 10. In other words, when chain guide 52 is closest to the frame of bicycle 10, the chain guide 52 holds the chain 24 over the sprocket (low gear) 20*a* that is closest to the bicycle frame 14.

The shift assisting apparatus 30 includes an actuator 60 that operates a power transfer mechanism 62 such that the rotational force of the crank arm 26*a* pulls or releases the operating wire 56 of the front derailleur 28. The actuator 60 is operatively coupled to the shift control unit 32 via the electrical control cord 36 and to the shifting device 34*b* via the electrical cord 38*b* for receiving the upshift signal and the down shift signal. The actuator 60 is operatively coupled to the power transfer mechanism 62, which operates the front derailleur 28. The power transfer mechanism 62 is operatively coupled to the crank arm 26*a* as explained below.

As seen in FIGS. 10–14, the actuator 60 basically includes a housing 70 with a motor 72 and a gear drive 74 mounted therein. The housing 70 is mounted to the rear or inside surface of the power transfer mechanism 62 via bolts (not shown) such that the gear drive 74 operates the power transfer mechanism 62.

Figure 6:
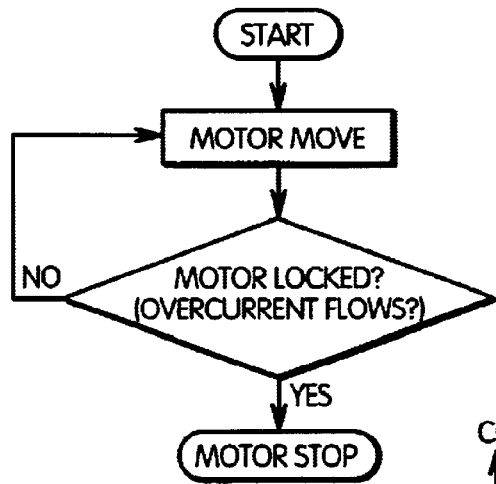
FIG. 6 is a flowchart illustrating a motor control routine for stopping the motor of the shift assisting apparatus for the front derailleur assembly illustrated in FIGS. 3 and 4.
Figure 7:
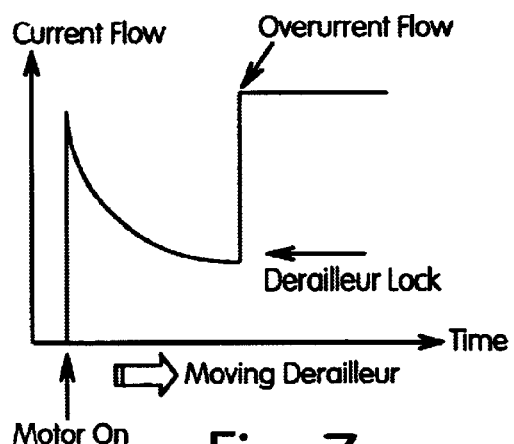
FIG. 7 is a graph illustrating the current flow to the motor verses movement of the front derailleur during a shift operation of the front derailleur assembly illustrated in FIGS. 3 and 4.
Figure 8:
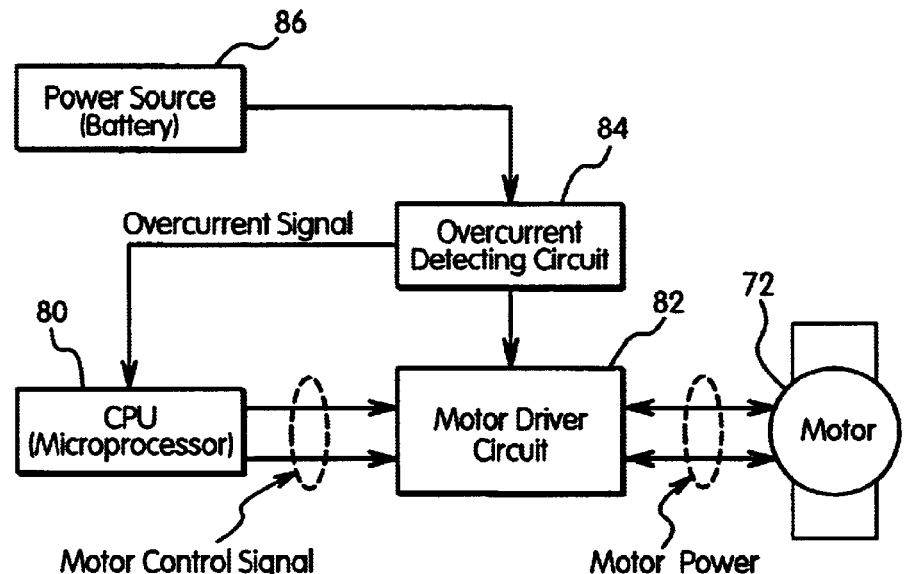
FIG. 8 is a schematic diagram illustrating the operation of the motor of the front derailleur assembly.

The motor 72 of the actuator 60 is electrically connected by a pair of wires 83 of the cord 36 to the shift control unit 32 which has a microcomputer 80 with a motor driver circuit 82 and an overcurrent detecting circuit 84 which are both operatively coupled to the central processing unit of the microcomputer 80. The power source or battery 86 is also located in the shift control unit 32, and is operatively coupled to the motor 72 via the motor driver circuit 82 and the overcurrent detecting circuit 84. The central processing unit of the microcomputer 80, the motor driver circuit 82 and the overcurrent detecting circuit 84 operate together to stop the movement of the motor 72 upon detection of the motor 72 locking up. As seen in FIGS. 6 and 7, the microcomputer 80 has a control program which receives an overcurrent signal from the overcurrent detecting circuit 84 for controlling the operation of the motor 72. More specifically, when the rider pushes a button on the shifting device 34b to start a shifting operation, the microcomputer 80 will then send a signal to the motor driver circuit 82 to have the power source or battery 86 energize the motor 72 in the desired direction. The motor 72 is preferably a reversible motor that can be driven in either a clockwise or a counterclockwise direction so as to move the derailleur 28 between first and second shift positions. The overcurrent detecting circuit 84 will stop energizing the motor 72 when the derailleur 28 reaches the new position. In other words, when the motor 72 locks up, this will increase the current level such that an overcurrent signal is sent from the overcurrent detecting circuit 84 back to the central processing unit of the microcomputer 80 to stop the electricity from energizing the motor 72.

Figure 9:
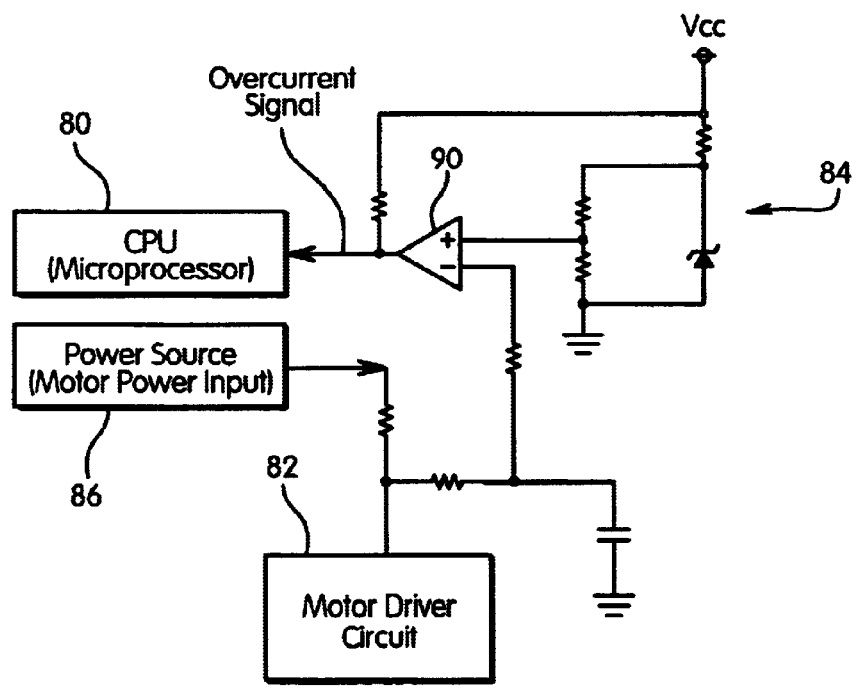
FIG. 9 is a schematic diagram illustrating the overcurrent detecting circuit for stopping the operation of the motor of the front derailleur assembly.
Figure 10:
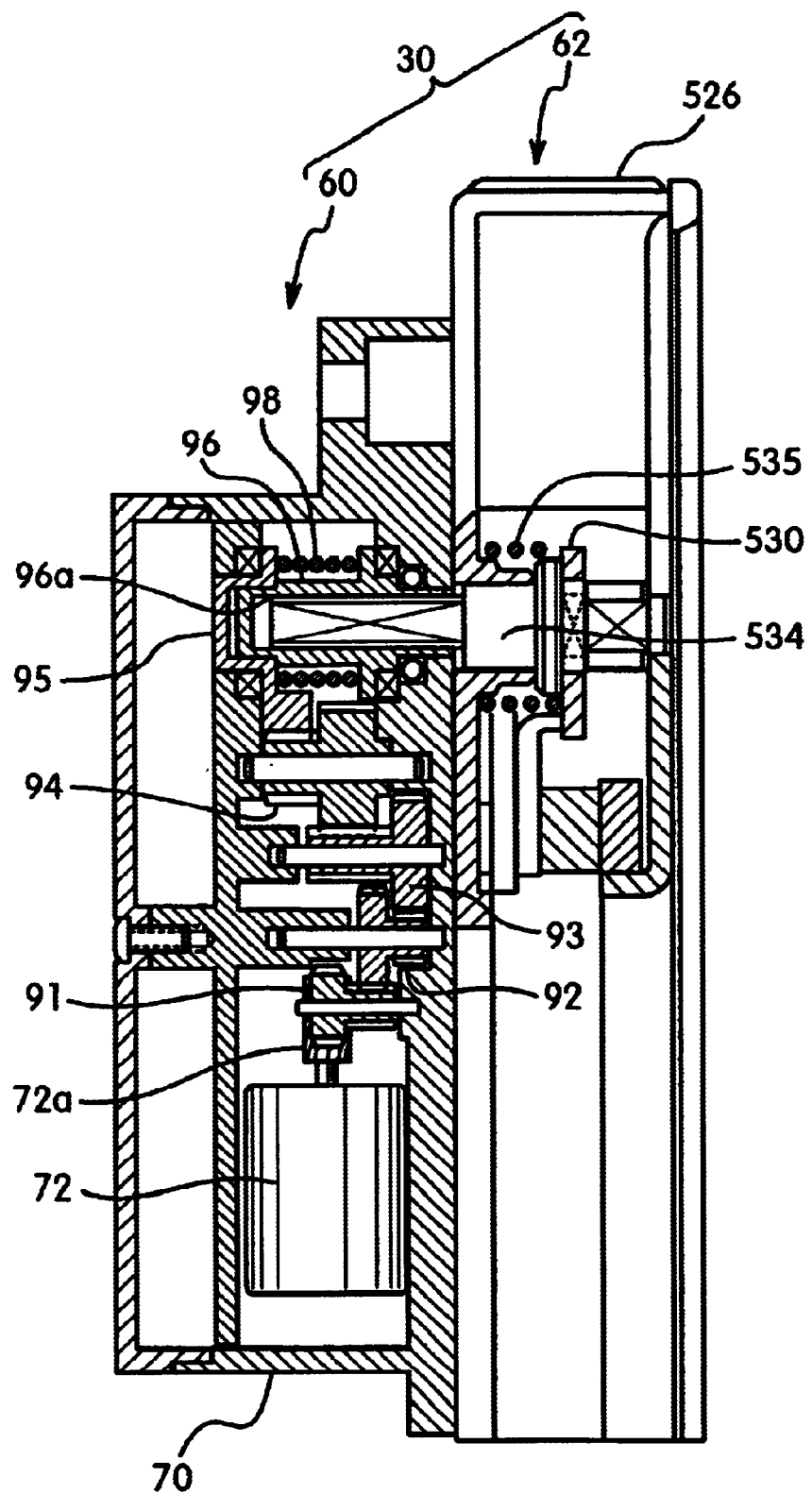
FIG. 10 is a bottom plan view of the shift assisting apparatus for the front derailleur assembly illustrated in FIGS. 3 and 4 with portions broken away for purposes of illustration.
Figure 11:
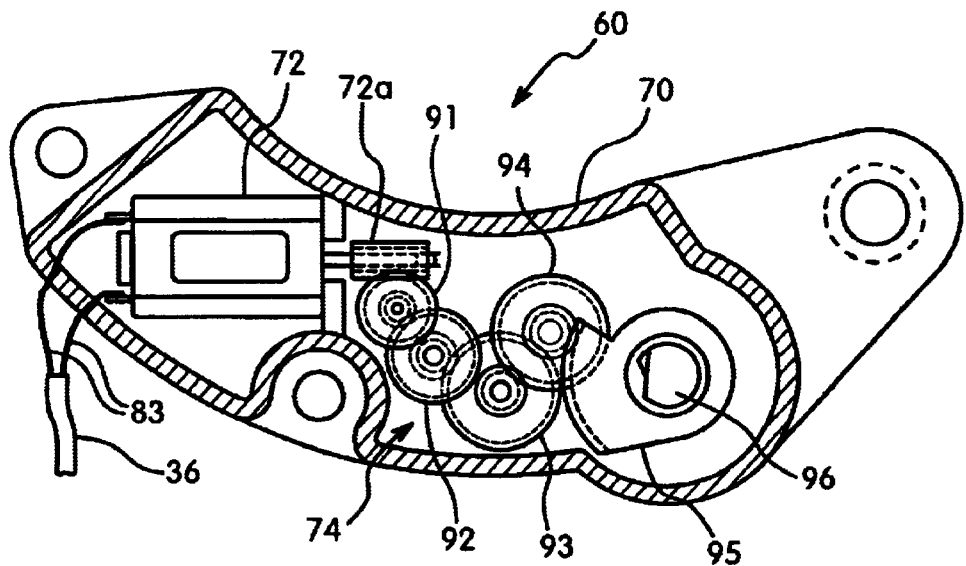
FIG. 11 is a cross sectional view of the motorized actuator of the shift assisting apparatus for the front derailleur assembly illustrated in FIGS. 3 and 4, with the driving axle in a first position.
Figure 12:
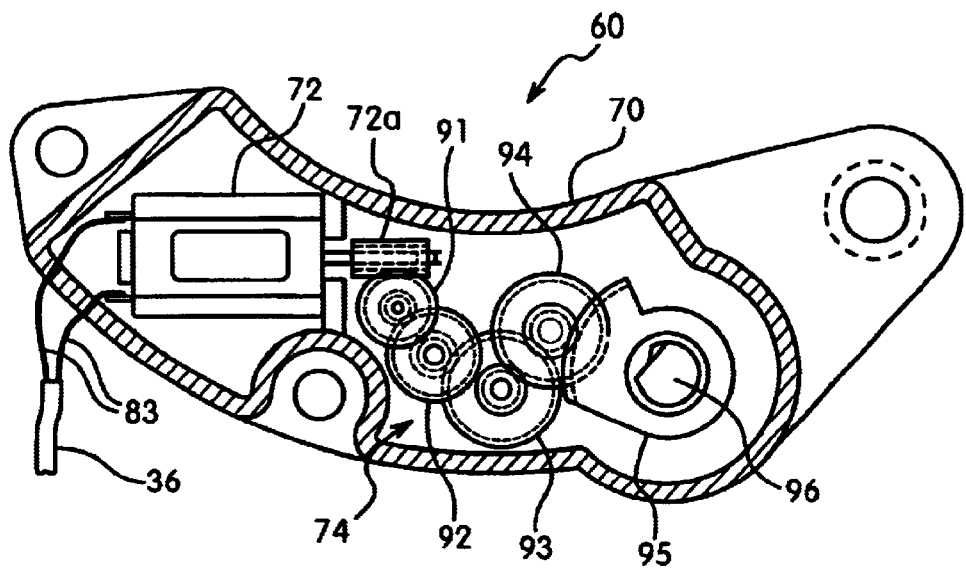
FIG. 12 is a cross sectional view of the motorized actuator of the shift assisting apparatus for the front derailleur assembly illustrated in FIGS. 3 and 4, with the driving axle in a second position.
Figure 13:
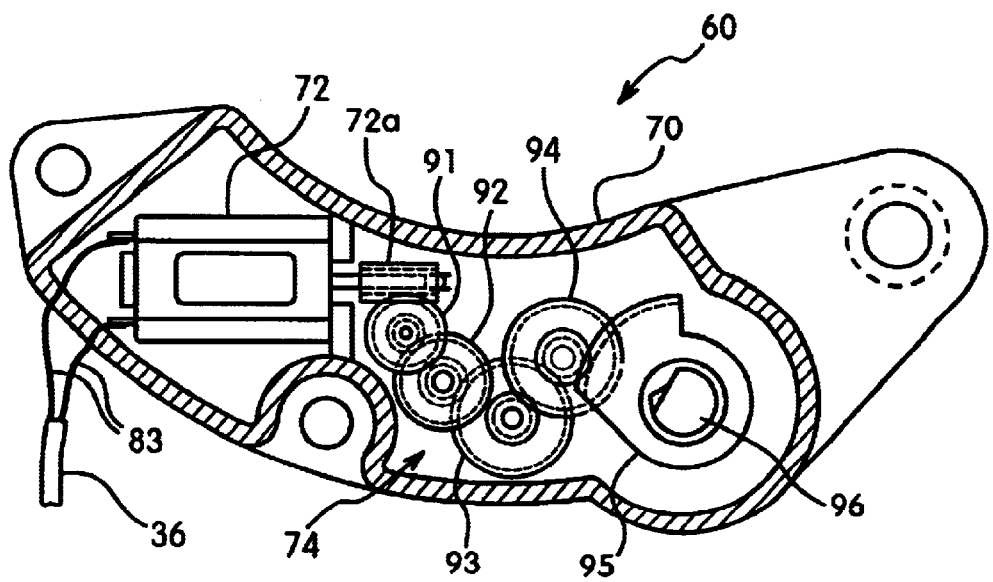
FIG. 13 is a cross sectional view of the motorized actuator of the shift assisting apparatus for the front derailleur assembly illustrated in FIGS. 3 and 4, with the driving axle in a third position.
Figure 14:
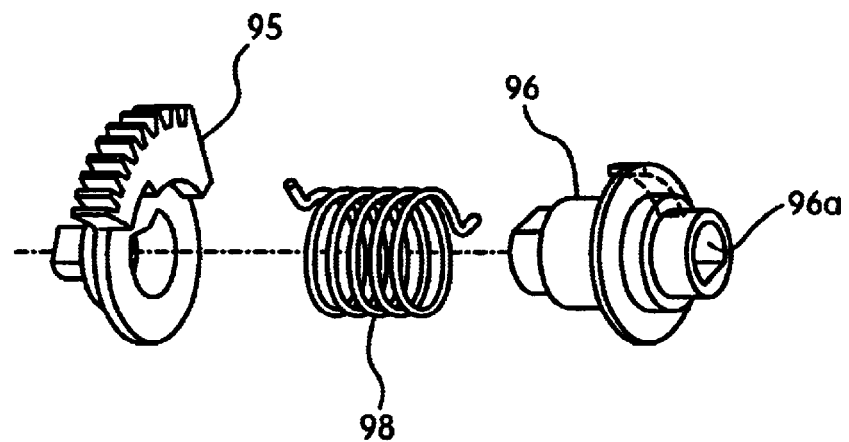
FIG. 14 is a perspective view of a portion of the driving axle of the motorized actuator of the shift assisting apparatus for the front derailleur assembly illustrated in FIGS. 3 and 4.

As seen in FIG. 9, the overcurrent detecting circuit 84 has a comparator 90 that compares the voltage being inputted into the motor driver circuit 82 with a predetermined voltage Vcc. If the voltage in the motor driver circuit 82 becomes greater than the predetermined voltage Vcc, then the comparator 90 will send a signal to the central processing unit of the microcomputer 80 to send a motor control signal to the motor driver circuit 82 which will stop the flow of current to the motor 72.

Referring now to FIGS. 10–14, the gear drive 74 of the actuator 60 will now be discussed in more detail. The gear drive 74 includes four power transfer gears 91–94 that transmits the rotation from the motor output gear 72a to driving gear 95. The driving gear 95 is coupled to a drive axle 96 for rotating drive axle 96 in either a clockwise or counterclockwise depending upon the direction of rotation of the gear 72a. Preferably, the drive gear 95 and the drive axle 96 have a small amount of rotational play therebetween. This rotational play is taken up by a torsion spring 98. This arrangement is designed to protect the gears from breaking when the motor 72 locks up but the energy to the motor 72 has not been discontinued. Moreover, the gears 91–95 cannot stop immediately due to inertia, thus, the torsion spring 98 further protects the gears from breaking. This torsion spring 98 also protects the gears 91–95 in the case of a double shift when the rider performs a second shift before the first shift is completed. The drive axle 96 has a center bore 96a that is coupled to the power transfer mechanism 62 as discussed below. Preferably, the bore 96a has a noncircular cross section.

Referring back to FIGS. 3 and 4, the bottom bracket 27 is operatively coupled to the shift assisting apparatus 30 according to the present invention for shifting a bicycle transmission or drive train 12. The general structure of the bottom bracket 27 is well known in the bicycle art, so a detailed description of those components shall be omitted. As discussed in more detail below, the shift assisting apparatus 30 upshifts a front derailleur 28 by moving an operating lever 58 clockwise and then downshifts front derailleur 28 by moving the operating lever 58 counterclockwise. Operating lever 58 is moved by the operating wire 56 coupled to the shift assisting apparatus 30 which, in turn, is connected to shift device 34b of the shifting control unit 32 located on the handlebar.

The power transfer mechanism 62 basically includes a drive ring 10 fixedly secured to the right crank arm 26a and a driven member 102 fixed to the outer sleeve 27a of the bottom bracket 27. Thus, the drive ring 100 rotates with the right crank arm 26a, while the driven member 102 is non-rotatably fixed to frame 14 by the bottom bracket 27. In this embodiment, the front derailleur 28 and the power transfer mechanism 62 both coupled to the bottom bracket 27. Alternatively, the driven member 102 of the power transfer mechanism 62 can act as the base member of front derailleur 28, if needed and/or desired.

Figure 4:
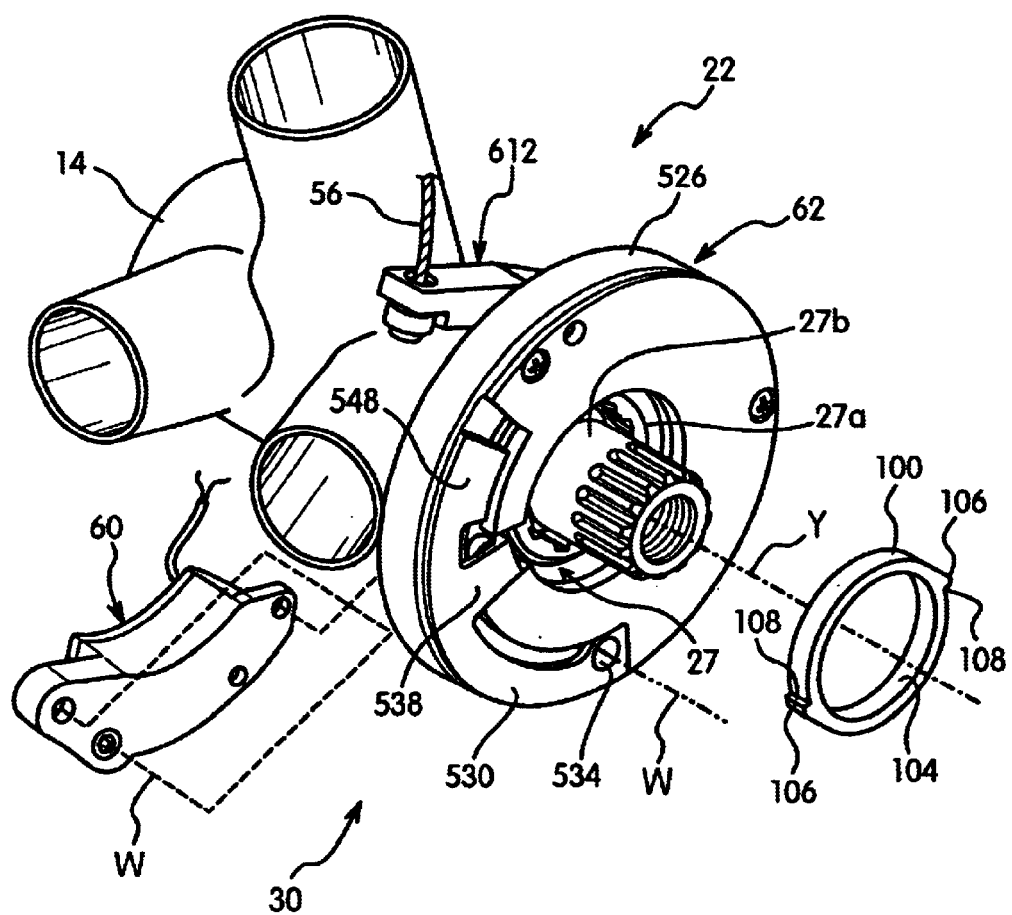
FIG. 4 is a partially perspective view the shift assisting apparatus for the front derailleur assembly illustrated in FIG. 3 with the derailleur and crank arm removed.
Figure 5:
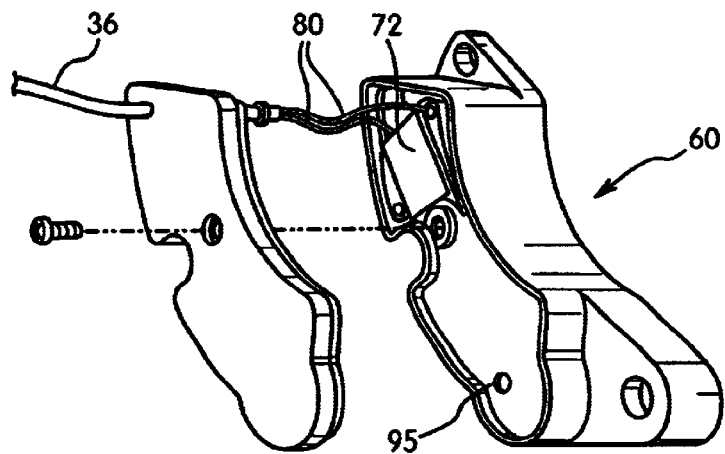
FIG. 5 is a perspective view of the motorized actuator of the shift assisting apparatus for the front derailleur assembly illustrated in FIGS. 3 and 4.

Referring to FIG. 4, a perspective view of the power transfer mechanism 62 is illustrated with the derailleur 28 and the crank arm 26a removed. The drive ring 100 is shown with a smooth inner peripheral surface 104 that is press-fitted on to the inner end of the crank arm 26a. Of course, the inner peripheral surface 104 can have splines that mate with corresponding splines of the crank arm 26a. Alternatively, the drive ring 100 can be fixed to the axle 27b of the bottom bracket 27. The outer peripheral surface of the drive ring 100 forms a pair of drive projections 106 with abutment surfaces 108. The abutment surfaces 108 are disposed 180° from each other and facing in the forward direction of rotation of the bottom bracket 27 and the crank arm 26a. In other words, the abutment surfaces 108 face in the clockwise direction in FIG. 4. The abutment surfaces 108 follow an imaginary straight line extending radially outwardly from the axis of rotation Y of the bottom bracket 27. The outer peripheral surface of the drive ring 100 at the location of intersection with the abutment surfaces 108 extends clockwise in FIG. 4 at a constant radius of curvature for more than 20° and, in this embodiment, more than 45° until it nears the rear of the following the drive projection 106, whereupon the radius of curvature increases in a non-curvature manner to the tip of the projection 106. In this embodiment, the outer peripheral surface of the drive ring 100 forms a flat ramp up to the tip of the corresponding projection, but it could be arcuate as well. As seen clearly in FIG. 4, the drive projections 106 extend only slightly from the outer peripheral surface of the drive ring 100. As shown FIGS. 16–21, the drive ring 100 will be illustrated as being an integrally part of the axle 27b of the bottom bracket 27 to help understand the operation of the device.

The driven member 102 basically includes a mounting member 526, an accurate operating lever 530, a cam ring or member 604, a cam follower 612, a first coupling member 654 and a second coupling member 656.

Figure 16:
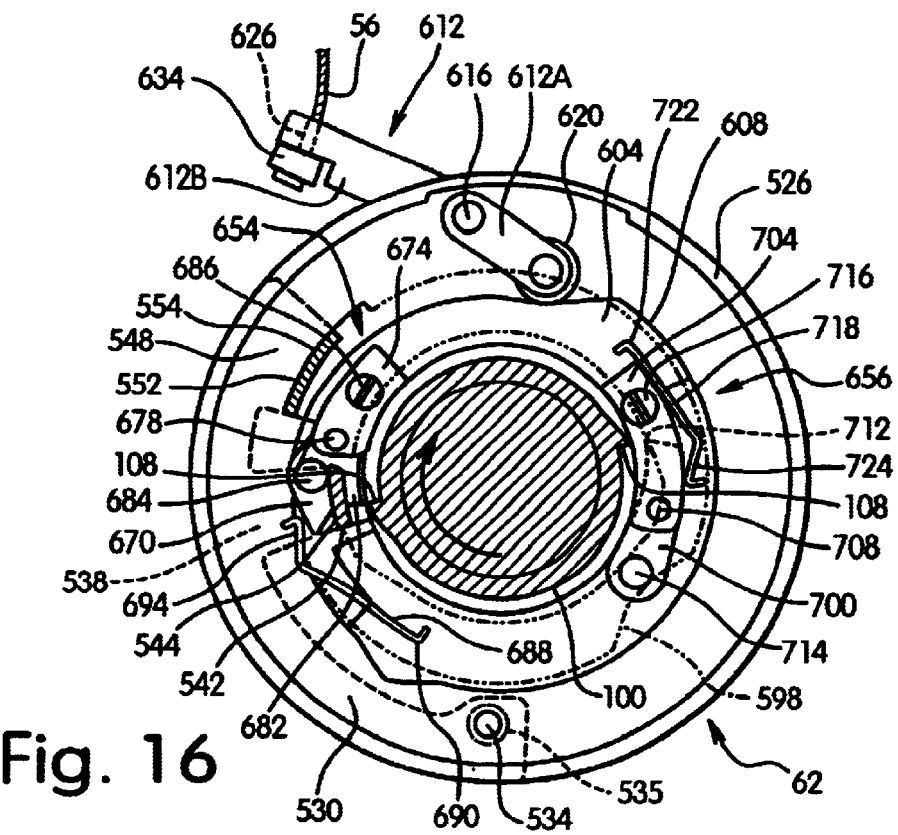
FIG. 16 is a side elevational view of the shift assisting apparatus illustrated in FIGS. 3 and 4 in an idle state.
Figure 17:
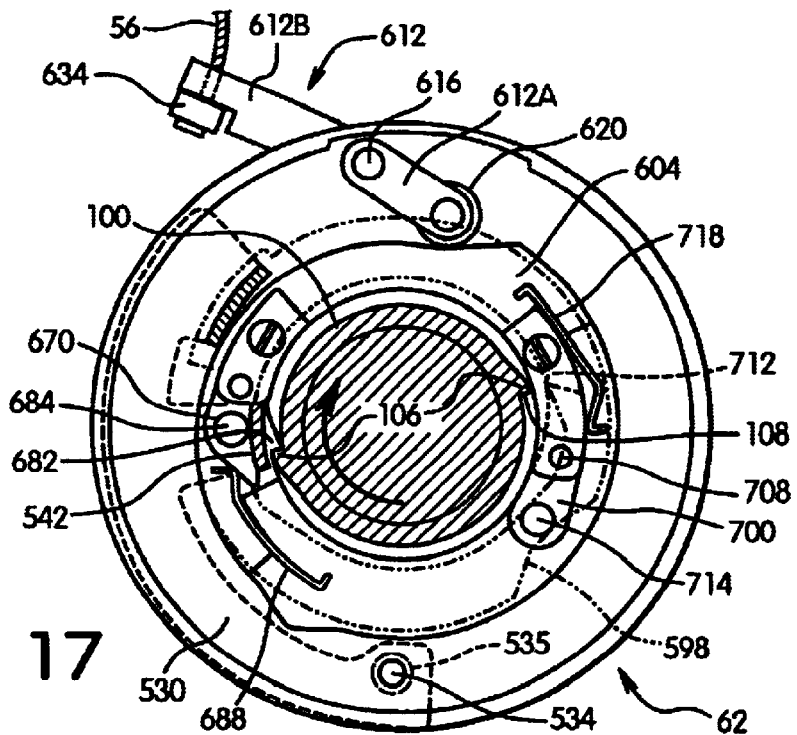
FIG. 17 is a side elevational view of the shift assisting apparatus illustrated in FIGS. 3 and 4 when the driving axle is rotated in a first direction.

An accurate operating lever 530 has a first end pivotally connected to the mounting member 526 through a pivot shaft 534 for pivoting around an operating axis W. The pivot shaft 534 has one end received in the bore 96a of the drive axle 96 of the actuator 60. Thus, the motor 72 rotates the pivot shaft 534 to operate the power transfer mechanism 62. The operating lever 530 has a limited range of movement which stops or locks the motor 72 from operating in both directions. The two locker stop positions are shown in FIGS. 16 and 17. When the operating lever 530 moves between FIGS. 16 and 17, then the first control ledge 542 allows the first pawl 670 to engage a drive ring 100. Then, the electrical step is finished. An overcurrent occurs and the overcurrent detecting circuit 84 stops electricity to the motor 72. When the operating lever 530 moves back to the position in FIG. 16, the operating lever 530 hits the mounting member 526. Then, the electrical step is finished. An overcurrent occurs in motor 72 and the overcurrent detecting circuit 84 stops electricity to the motor 72. A spring 535 is disposed around the pivot shaft 534 and is connected between the mounting member 102 and the operating lever 530 for biasing the operating 530 in the counterclockwise direction. A first control projection 538 extends radially inwardly from an intermediate portion of the operating lever 530 and terminates with a laterally inwardly extending the first pawl control ledge 542 (FIG. 16) having a radially outwardly facing first pawl control surface 544. Similarly, a second control projection 548 extends radially inwardly from the second end of operating lever 530 and terminates with a laterally inwardly extending second pawl control ledge 552 having a radially inwardly facing a second pawl control surface 554.

Figure 15A:
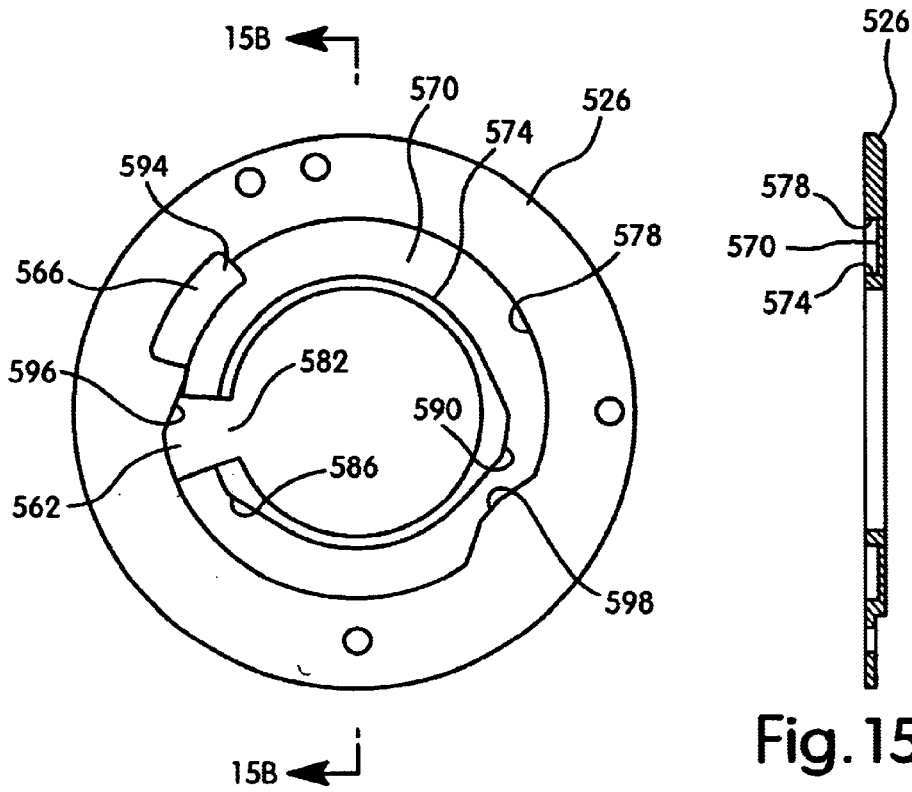
FIG. 15A is a side view of the mounting member used with the shift assisting apparatus for the front derailleur assembly illustrated in FIGS. 3 and 4, and illustrating the configuration of control surfaces.
Figure 15B:
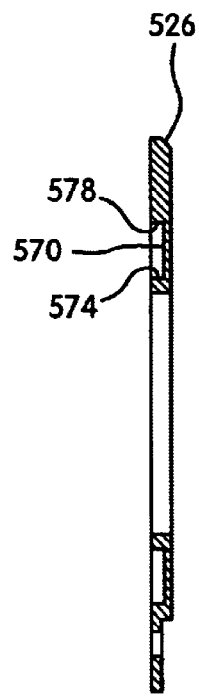
FIG. 15B is a cross sectional view of the mounting member illustrated in FIG. 15A taken along line 15B—15B in FIG. 15A.

FIGS. 15A and 15B show the mounting member 110 in more detail. The mounting member 526 includes a first ledge opening 562 for receiving the first pawl control ledge 542 therethrough, a second ledge opening 566 for receiving the second pawl control ledge 552 therethrough, and a pawl control groove 570 formed by a radially outwardly facing pawl control surface 574 and a radially inwardly facing pawl control surface 578. The pawl control surface 574 has a generally circular shape, except for a first control ledge passage 582, for allowing radially inward movement of first control ledge 542, a pawl decoupling ramp 586 and a pawl decoupling ramp 590. Similarly, the pawl control surface 578 has a generally circular shape, except for a second control ledge passage 594, for allowing radially outwardly movement of the second control ledge 552, a pawl decoupling ramp 596 and a pawl decoupling ramp 598. The functions of pawl decoupling rams 586, 590, and 598 will be discussed below.

As shown in FIG. 16, a cam member 604 having a cam surface 608 is mounted to the mounting member 526 for rotation around the axis Y shown in FIG. 4. A cam follower 612 has the form of a two-piece lever (612A, 612B) wherein a first end of lever piece 612A is pivotally mounted to the mounting member 526 through a pivot shaft 616 and a second end of lever piece 612A includes a roller 620 for engaging the cam surface 608. The pivot shaft 616 extends through the side of the mounting member 526 and is coupled to a first end of the lever piece 612B. A second end of the lever piece 612B contains a transmission actuating coupling member in the form of an opening 626 for receiving a derailleur actuating wire 630 therethrough. The derailleur actuating wire 630 has a wire end bead 634 for preventing the derailleur actuating wire 630 from being pulled upwardly out of the opening 626.

The first coupling member 654 is coupled for rotation of the cam member 604, such that the first coupling member 654 moves between a first engaged position and a first disengaged position. The second coupling member 656 is coupled for rotation of the cam member 604, such that the second coupling member 656 moves between a second engaged position and a second disengaged position.

The first coupling member 654 comprises a first pawl 670 and a first pawl mounting member 674. A first end of the first pawl 670 is pivotally connected to the first pawl mounting member 674 through a first pivot shaft 678, and a second end of first pawl 670 has a radially inwardly extending first pawl tooth 682 and a first pawl control abutment 684. The first pawl mounting member 674 is fixedly coupled to the cam member 604 by a screw 686. A first biasing mechanism in the form of a first leaf spring 688 has a first end 690 fixedly coupled to the cam member 604 and a second end 694 abutting against the second end of the first pawl 670. The first leaf spring 688 biases the first pawl tooth 682 radially inwardly to a first engaged position such that the first pawl 670 engages either of the two abutment surfaces 108 of the drive ring 100 as discussed below.

Similarly, the second coupling member 656 comprises a second pawl 700 and a second pawl mounting member 704. An intermediate portion of second pawl 700 is pivotally connected to the second pawl mounting member 704 through a second pivot shaft 708. A first end of second pawl 700 has a radially inwardly extending second pawl tooth 712, and a second end of second pawl 700 has second pawl control abutment 714. The second pawl mounting member 704 is fixedly coupled to the cam member 604 by a screw 716. A second biasing mechanism in the form of a second leaf spring 718 has a first end 722 fixedly coupled to the cam member 604 and a second end 724 abutting against the first end of the second pawl 700. The second leaf spring 718 biases the second pawl tooth 712 radially inwardly to a second engaged position such that the second pawl 700 engages either of the two abutment surfaces 108 of the drive ring 100 as discussed below.

The operation of the shift assisting apparatus 30 may be understood by referring to FIGS. 16–20. FIG. 16 shows the shift assisting apparatus 30 in a steady-state idle condition. In this initial condition, the first pawl control surface 544 of the first pawl control ledge 542 supports the first pawl control abutment 684 so that the first pawl tooth 682 is held radially outwardly in the first disengaged position, and the pawl decoupling ramp 598 presses the second pawl control abutment 714 radially inwardly so that the second pawl tooth 712 is held radially outwardly in the second disengaged position. Thus, the drive ring 100 rotates together with the axle 27b without having any effect on the shift assisting apparatus 30.

FIG. 17 shows what happens when the drive axle or pivot shaft 534 is rotated in the clockwise direction is pulled upwardly. In this case, the operating lever 530 pivot clockwise with the pivot shaft 534 against the biasing force of the spring 535, and the first pawl control ledge 542 allows the first pawl control abutment 684 to move radially inwardly. As a result, the first pawl 670 rotates counterclockwise in accordance with the biasing force of the first leaf spring 688, thus moving the first pawl tooth 682 radially inwardly into the first engaged position. Thus, when one of the abutment surfaces 108 of the drive ring 100 rotates to the circumferential position of the first pawl 670, the first pawl tooth 682 contacts the abutment, and the cam member 604 rotates clockwise together with the drive ring 100 and the axle 27b to the position shown in FIG. 18. At the same time, the second pawl control abutment 714 slides off of the pawl decoupling ramp 598, and the second pawl 700 rotates counterclockwise around the pivot shaft 708 in accordance with the biasing force of the second leaf spring 718 so that the second pawl tooth 712 moves radially inwardly into the second engaged position to contact the other one of the abutments 108.

Figure 18:
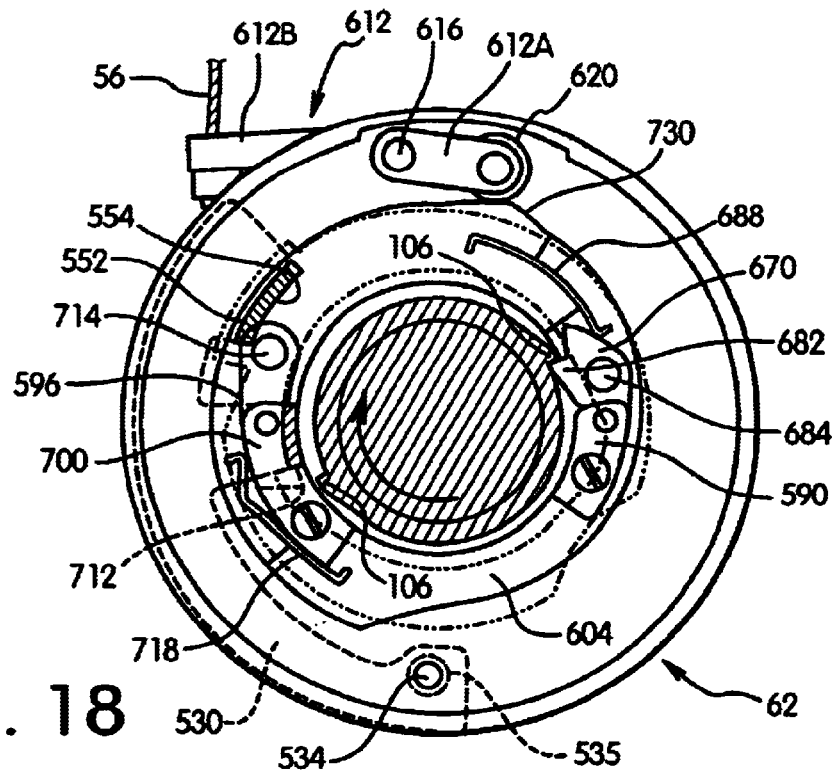
FIG. 18 is a side elevational view of the shift assisting apparatus illustrated in FIGS. 3 and 4 showing the derailleur positioning cam rotating with the rotating member for pulling the derailleur actuating wire.

The cam surface 608 has an increasing radius in the counterclockwise direction, so the roller 620 on the lever piece 612A moves radially outwardly, thus causing the lever piece 612B to pull the actuating wire 630 downwardly. Clockwise rotation of the cam member 604 continues until the cam surface 608 causes the cam follower 612 to nearly complete the necessary amount of pulling of the derailleur actuating wire 630 as shown in FIG. 18. At this time, the first pawl control abutment 684 is near the pawl decoupling ramp 590 and the second pawl control abutment 714 slides up the pawl decoupling ramp 596 (rotating the second pawl 700 clockwise), contacts the second pawl control surface 554 of the second pawl control ledge 552 and disengages the second pawl tooth 712 from abutment surface 108. Also, the roller 620 on the lever piece 612A is disposed immediately counterclockwise of a the cam ridge 730 on the cam 604.

Figure 19:
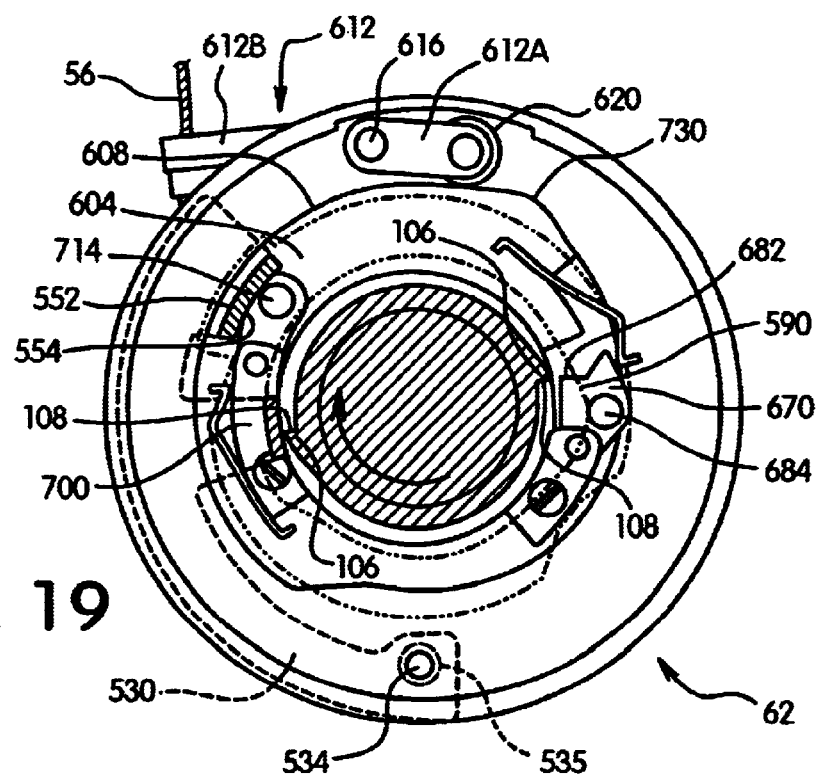
FIG. 19 is a side elevational view of the shift assisting apparatus illustrated in FIGS. 3 and 4 when the shift assisting apparatus has completed the shifting operations.

As shown in FIG. 19, as the cam member 604 continues to rotate, the first pawl control abutment 684 slides up the pawl decoupling ramp 590 so that the first pawl 670 rotates clockwise and moves the first pawl tooth 682 into the first disengaged position. Also, the second pawl control abutment 714 moves to the clockwise end of the second pawl control surface 554. The radially inward force applied by the roller 620 to the cam ridge 730 ensures that the cam member 604 rotates slightly clockwise so that the first pawl control abutment 684 is properly positioned on the pawl decoupling ramp 590 and the first pawl tooth 682 is disengage from the abutment surface 108. At that time, the cam member 604 stops rotating and the derailleur actuating wire 630 is maintained in the upshifted position.

Figure 20:
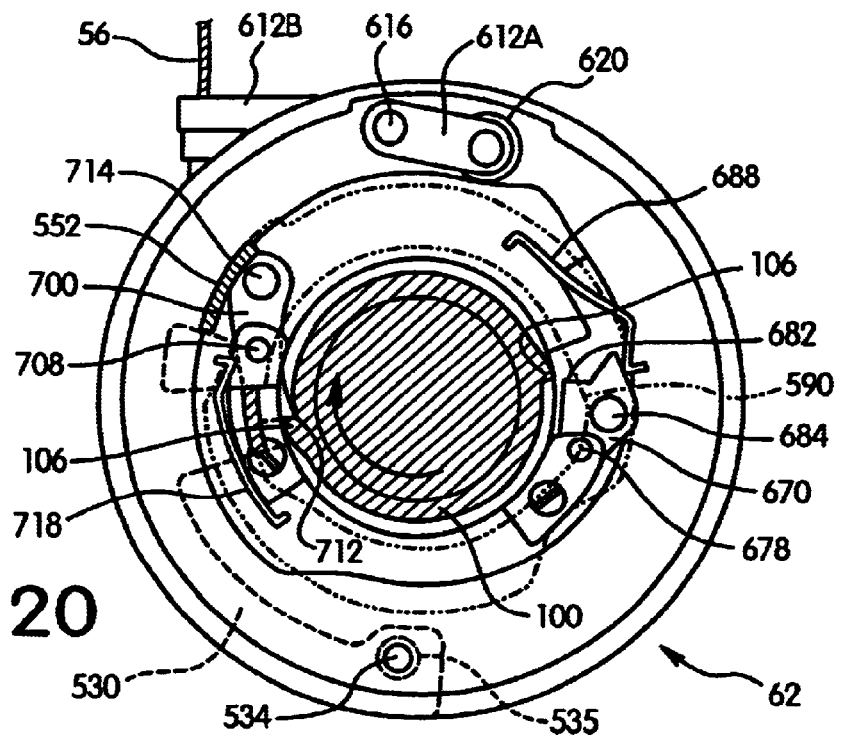
FIG. 20 is a side elevational view of the shift assisting apparatus illustrated in FIGS. 3 and 4 when the driving axle is rotated in a second direction.

To release the actuating wire 630 to shift the bicycle transmission into the downshifted position, the pivot shaft 3534 is released as shown in FIG. 20. In this case, the operating lever 530 pivots counterclockwise around pivot shaft 534 in accordance with the biasing force of the spring 535, and the second pawl control ledge 552 allows the second pawl control abutment 714 to move radially outwardly. As a result, the second pawl 700 rotates counterclockwise around the pivot shaft 708 in accordance with the biasing force of the second leaf spring 718, thus moving the second pawl tooth 712 into the second engaged position. Thus, when one of the abutment surfaces 108 of the drive ring 100 rotates to the circumferential position of the second pawl 700, the second pawl tooth 712 contacts one of the abutment surfaces 108, and the cam member 604 rotates clockwise together with the drive ring 100 and the axle 27b to the position shown in FIG. 21. At the same time, the first pawl control abutment 684 slides off of the pawl decoupling ramp 590, and the first pawl 670 rotates counterclockwise around the pivot shaft 678 in accordance with the biasing force of the first leaf spring 688 so that the first pawl tooth 682 moves radially inwardly into the first engaged position to contact the other one of the abutment surfaces 108.

Figure 21:
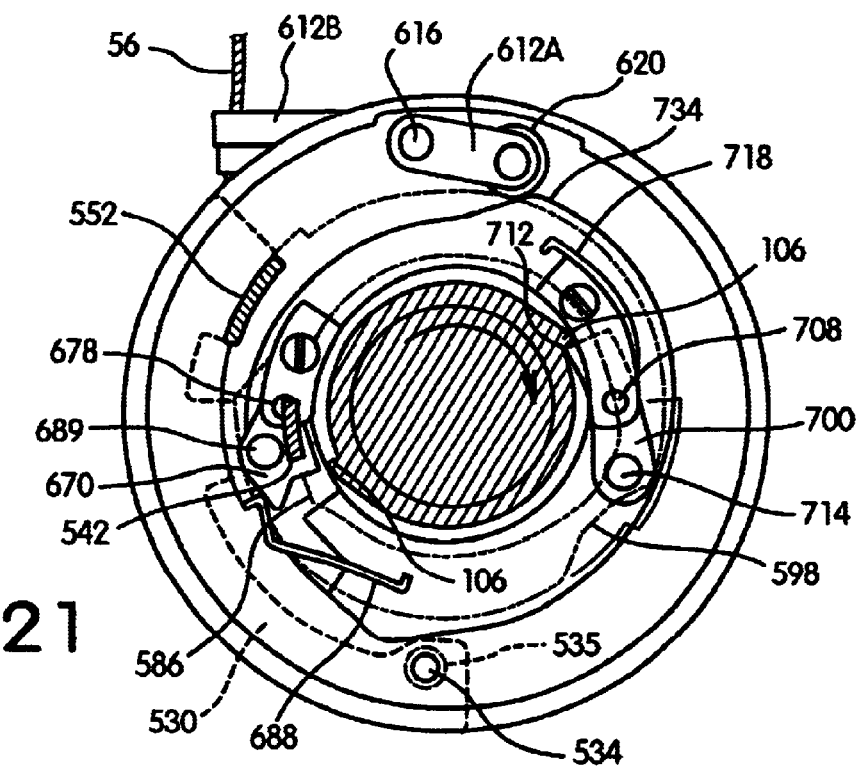
FIG. 21 is a side elevational view of the shift assisting apparatus illustrated in FIGS. 3 and 4 when the shift assisting apparatus has completed the shifting operations.

This portion of the cam surface 608 contacting the roller 620 has a decreasing radius in the counterclockwise direction, so the roller 620 on the lever piece 612A moves radially inwardly, thus causing the lever piece 612B to release the derailleur actuating wire 630. Clockwise rotation of the cam member 604 continues until the cam surface 608 causes the cam follower 612 to nearly complete the necessary amount of releasing of the actuating wire 630 as shown in FIG. 21. At this time, the second pawl control abutment 714 is near the pawl decoupling ramp 598, and the first pawl control abutment 684 slides up the pawl decoupling ramp 586 (thus rotating the first pawl 670 clockwise), contacts the first pawl control surface 544 of the first pawl control ledge 542 and disengages the first pawl tooth 682 from one of the abutment surfaces 108. Also the roller 620 on the cam follower lever 612 is disposed immediately counterclockwise of a cam ridge 734 on the cam 604.

As the cam member 604 continues to rotate, the second pawl control abutment 714 slides up the pawl decoupling ramp 598 so that the second pawl 700 rotates clockwise to move the second pawl tooth 712 into the second disengaged position, and the first pawl control abutment 684 moves to the clockwise end of the first pawl control surface 544. The radially inward force applied by the roller 620 to the cam ridge 734 ensures that the cam member 604 continues rotating until the second pawl control abutment 714 is properly positioned on the pawl decoupling ramp 598 and the second pawl tooth 712 is disengaged from the abutment surface 108. At that time, the cam member 604 stops rotating, and the actuating wire 630 is maintained in the upshifted position as shown by the initial position in FIG. 16.

Front Suspension Assembly

Figure 22:
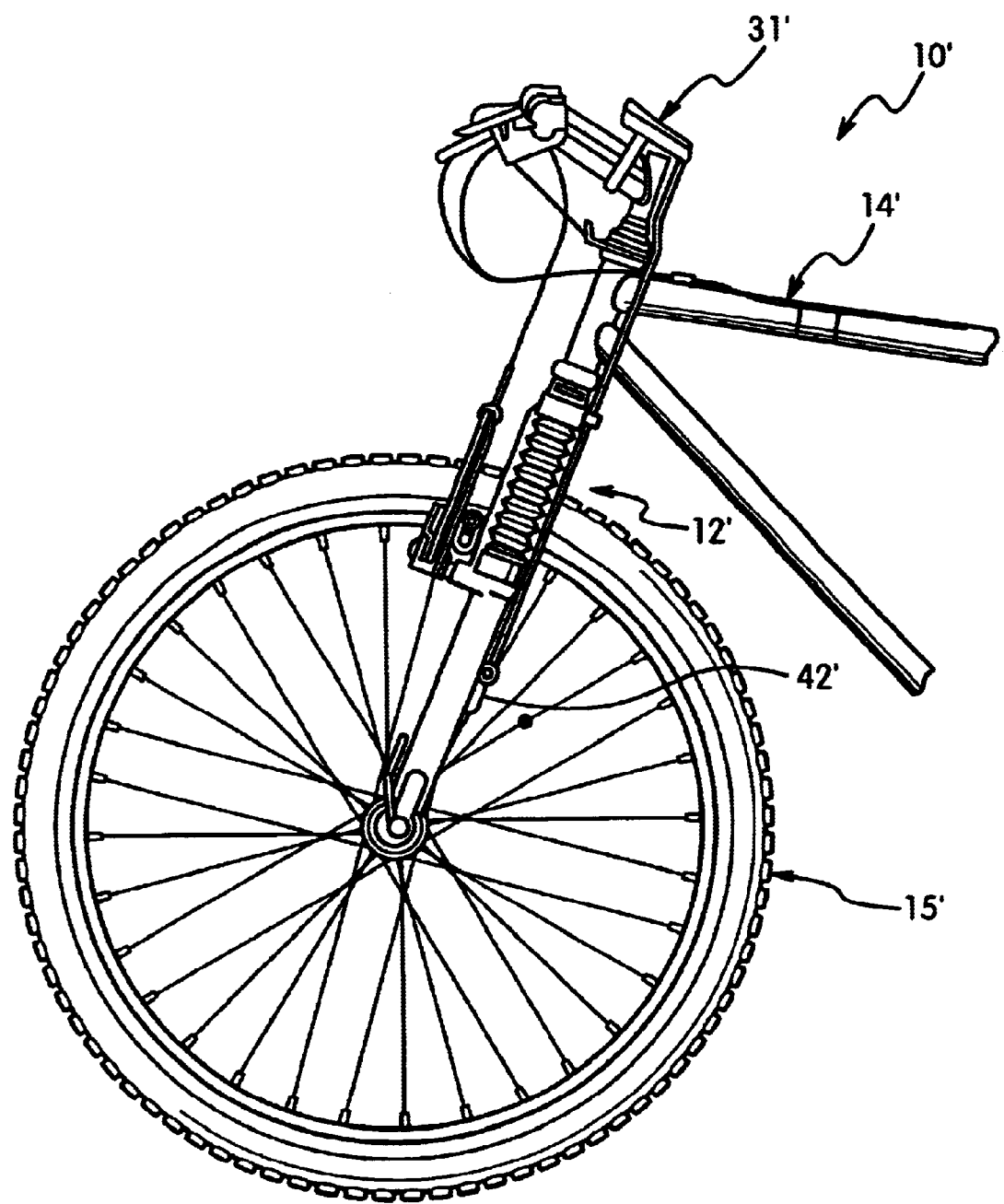
FIG. 22 is a partial side elevational view of a conventional bicycle with an electronically controlled front suspension in accordance with a second embodiment of the present invention.
Figure 23:
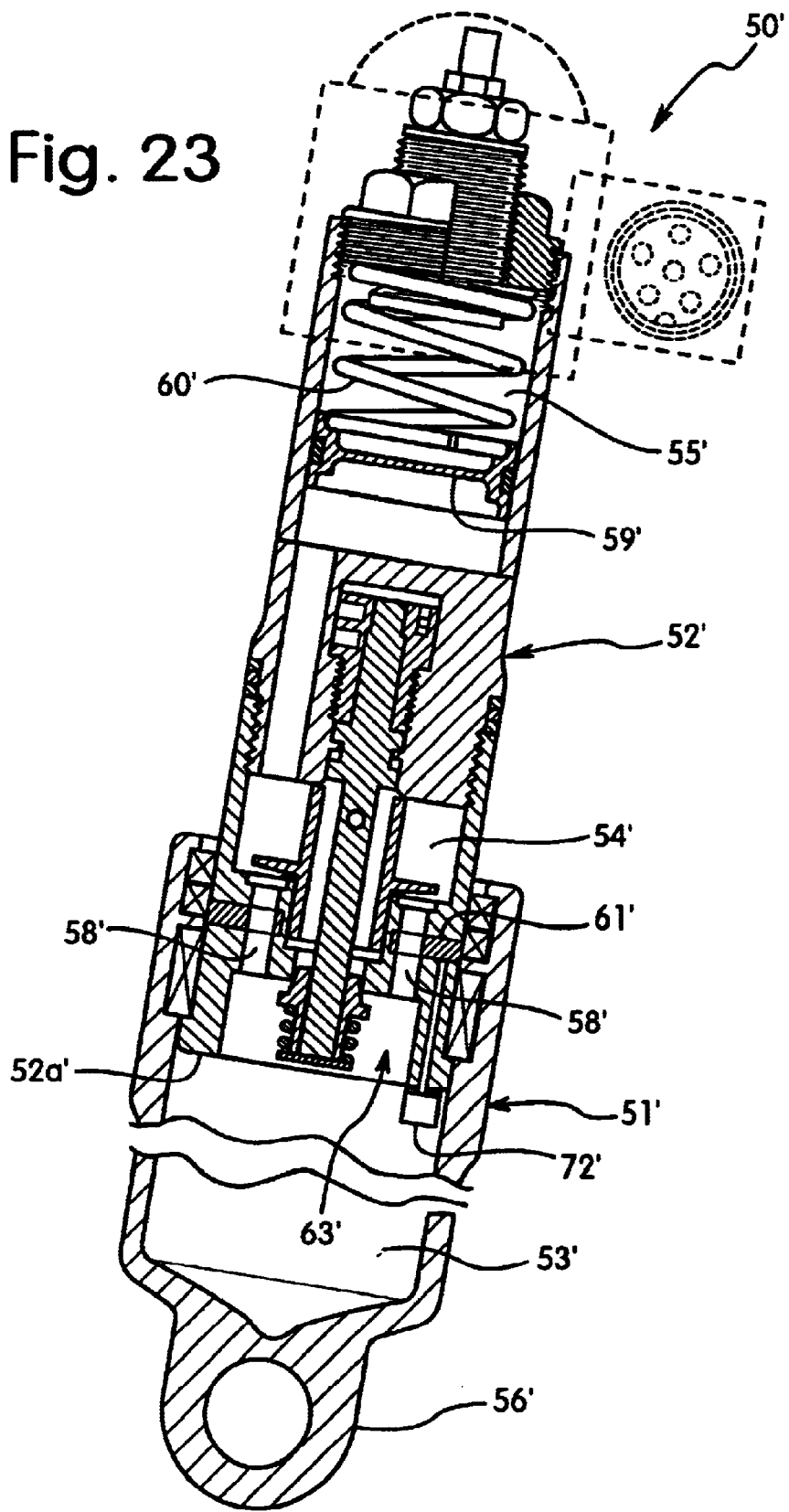
FIG. 23 is a longitudinal cross-sectional view of one of the front cylinders for the front suspension assembly in accordance with the present invention.

Referring now to FIGS. 22–23, a bicycle 10' is illustrated with an electronically controlled front suspension assembly 12' in accordance with a second embodiment. Basically, the method of controlling the drive train 12 of the first embodiment is now being used to control the front suspension assembly 12'. In view of the similarity between the first and second embodiments, the second embodiment will not be discussed or illustrated in detail.

The bicycle 10' basically has a frame 14' and a pair of wheels 15' (only one shown), with the front wheel being coupled to the frame 14' by the front suspension assembly 12'. The bicycle 10' and its various components are well known in the prior art, except for the improved portions of the front suspension assembly 12' of the present invention. Thus, the bicycle 10' and its various components will not be discussed or illustrated in detail herein, except for the components that relate to the front suspension assembly 12' of the present invention. Moreover, various conventional bicycle parts such as brakes, additional sprockets, etc., which are not illustrated and/or discussed in detail herein, can be used in conjunction with the present invention.

An electronic control system 31' basically controls the stiffness of the front suspension assembly 12'. Preferably, the electronic control system 31' is programmable either by the rider or by the bicycle manufacturer such that the stiffness of the front suspension assembly 12' will be adjusted based on one or more of the various parameters that have been sensed and/or calculated. In other words, the amount of stiffness can be modified based on one or more parameters, such as inclination of the bicycle 10', current torque, gear selection, speed, etc. Moreover, it is within the scope of this invention for the rider to program which variables will increase or decrease the stiffness of the suspension assembly 12'. The front suspension assembly 12' will either stiffen or soften accordingly based on the signals received from the electronic control system 31'.

The electronic control system 31' utilizes a plurality of sensors such as a velocity sensor 42' to determine when to electronically adjust the front suspension assembly 12' in response to various factors or conditions. These sensors are electrically coupled to the electronic control system 31' by electrical wires in a conventional manner for inputting various electrical signals, which are indicative of certain conditions. The signals from the sensors are preferably electrical signals that are utilized by the electronic control system 31' to calculate various conditions affecting the bicycle 10'. Of course, more or other types of sensors can be used as necessary depending on the type of suspension assemblies used and/or the factors/conditions desired for adjusting the stiffness of the front suspension assembly 12'.

For the sake of simplicity, only one of the cylinders or shocks 50' from the front suspension assembly 12' will be discussed and illustrated herein. It will be apparent to those skilled in the art from this disclosure that a pair of cylinders or shocks 50' are utilized to form the front suspension assembly 12'. As seen in FIG. 23, each cylinder 50' basically includes outer and inner tubular telescoping members 51' and 52' defining inner cavities 53', 54' and 55' in the cylinder 50'. The outer tubular member 51' is coupled to the front wheel 15' by a mounting member 56', while the inner tubular member 52' is coupled to the frame 14' by a mounting member 57'. The outer tubular member 51' has the lower hydraulic cavity that receives the bottom end 52a' of the inner tubular member 52'. The bottom end 52a' of the inner tubular member 52a' forms a piston that has a plurality of orifices 58'. The orifices 58' fluidly couple the inner hydraulic cavities 53' and 54' together such that hydraulic fluid flows from the lower hydraulic cavity 53' to the upper hydraulic cavity 54' formed by a portion of the inner tubular member 52'. The inner tubular member 52' also has the air cavity or chamber 55' formed above the upper hydraulic cavity 54'.

The air chamber 55' and upper hydraulic cavity 54' are separated by an axially slidable piston 59'. Within the air chamber 55' is a coil spring 60'. The stiffness of the cylinder 50 is controlled by changing the size of the orifices 58' utilizing a control disk 61' that is rotatably mounted to change the size of the orifices 58'. In other words, the control disk 61' is moveable to change the amount of overlapping or closing of the orifices 58'. Preferably, the control disk 61' of the cylinder 50' is controlled by a electric motor 72' that rotates the control disk 61'. The electric motor 72' is electrically coupled to the electronic control system 31' that selectively operates the electrical motor 72' to adjust the stiffness of the cylinder 50'. Thus, the orifices 58' and the control disk 61' form a front cylinder control valve 63' that is automatically adjusted via the electronic control system 31'. The electric motors 72' and the front cylinder control valves 63' of the cylinders 50' form a front controller or adjustment mechanism that changes or adjusts the stiffness or softness of the front suspension assembly 12' based on the electronic control system 31'. Of course, it will be apparent to those skilled in the art from this disclosure that other types of adjustment mechanisms can be utilized for controlling the stiffness of the cylinder 50'.

Figure 24:
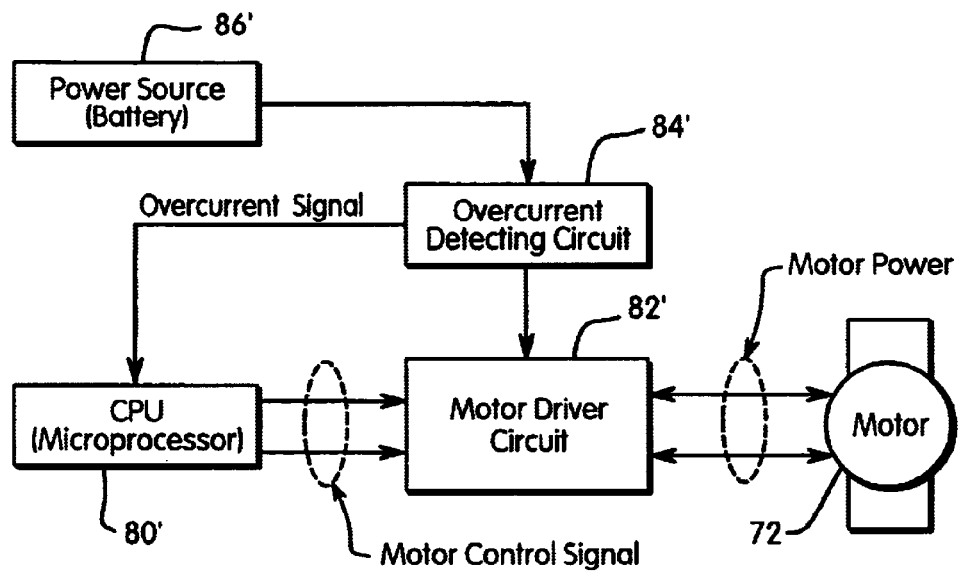
FIG. 24 is a schematic diagram illustrating the operation of the motor of the front suspension assembly.
Figure 25:
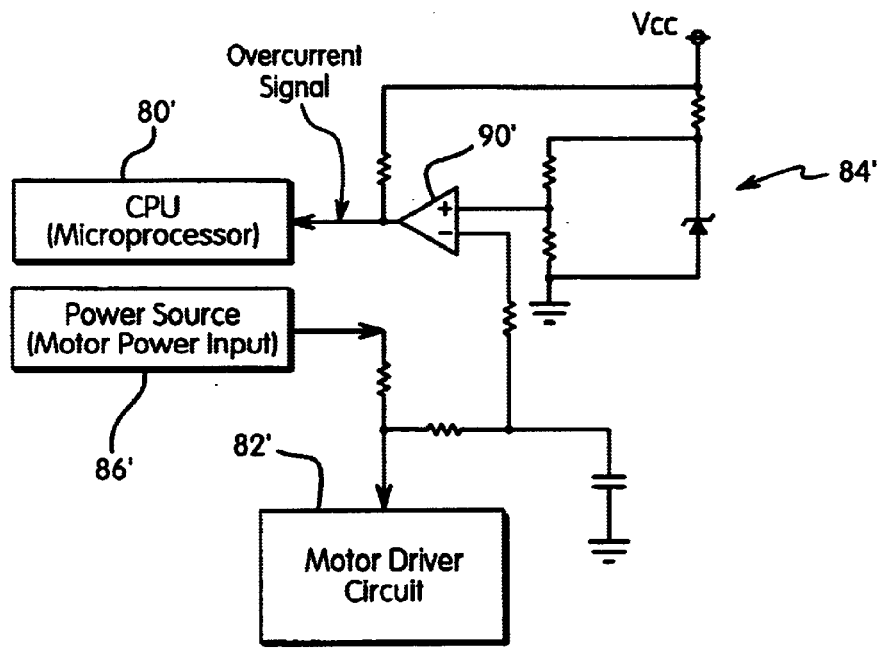
FIG. 25 is a schematic diagram illustrating the overcurrent detecting circuit for stopping the operation of the motor of the front suspension assembly.

As seen in FIGS. 24 and 25, the electronic control system 31' is a control unit or cycle computer that a microcomputer 80' formed on a printed circuit board that is powered by a battery unit. The microcomputer of the electronic control system 31' includes a central processing unit (CPU), a random access memory component (RAM), a read only memory component (ROM), and an I/O interface. The various components of the microcomputer are well known in the bicycle field. Therefore, the components used in the microcomputer of the electronic control system 31' will not be discussed or illustrated in detail herein. Moreover, it will be apparent to those skilled in the art from this disclosure that the electronic control system 31' can include various electronic components, circuitry and mechanical components to carryout the present invention. Of course, it will be apparent to those skilled in the art from this disclosure that the electronic control system 31' can have a variety of configurations, as needed and/or desired.

The motors 72' are controlled according to the program illustrated in FIG. 6. In other words, the electronic control system 31' energizes the motors 72' which in turn causes the control disk 61 of each of the cylinders 50' to rotate. Once the control disk 61' reaches an end position, the control disk stops and the motor locks. The locking of the motor 72' causes an overcurrent to occur such that the overcurrent detecting circuit 84' stops the motor 72'.

The motor 72' is electrically connected by a pair of wires to the electronic control system 31' which has a microcomputer 80' with a motor driver circuit 82' and an overcurrent detecting circuit 84' which are both operatively coupled to the central processing unit of the microcomputer 80'. The power source or battery 86' is also located in the electronic control system 31', and is operatively coupled to the motor 72' via the motor driver circuit 82' and the overcurrent detecting circuit 84'. The central processing unit of the microcomputer 80, the motor driver circuit 82' and the overcurrent detecting circuit 84' operate together to stop the movement of the motor 72' upon detection of the motor 72' locking up. As seen in FIGS. 24 and 25, the microcomputer 80' has a control program, which receives an overcurrent signal from the overcurrent detecting circuit 84' for controlling the operation of the motor 72'. More specifically, the microcomputer 80' will then send a signal to the motor driver circuit 82' to have the power source or battery 86' energize the motor 72' in the desired direction. The motor 72' is preferably a reversible motor that can be driven in either a clockwise or a counterclockwise direction so as to move the control disk 61' between first and second shift positions. The overcurrent detecting circuit 84' will stop energizing the motor 72' when the control disk 61' reaches the new position. In other words, when the motor 72' locks up, this will increase the current level such that an overcurrent signal is sent from the overcurrent detecting circuit 84' back to the central processing unit of the microcomputer 80' to stop the electricity from energizing the motor 72'.

As seen in FIG. 25, the overcurrent detecting circuit 84' has a comparator 90' that compares the voltage being inputted into the motor driver circuit 82' with a predetermined voltage Vcc. If the voltage in the motor driver circuit 82' becomes greater than the predetermined voltage Vcc, then the comparator 90' will send a signal to the central processing unit of the microcomputer 80 to send a motor control signal to the motor driver circuit 82' which will stop the flow of current to the motor 72'.

Alternative Motor Control Method

Figure 26:
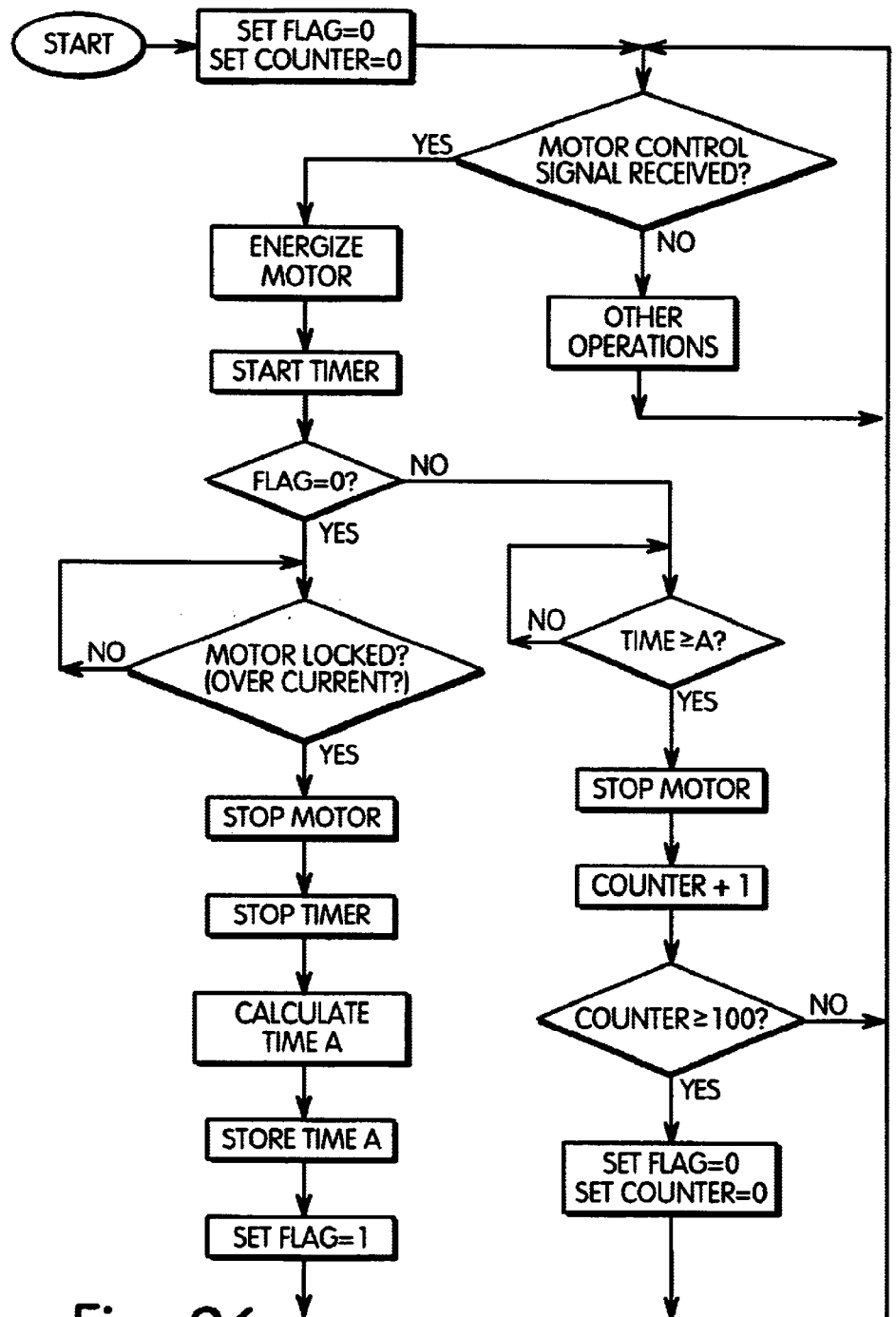
FIG. 26 is a flow chart illustrating a motor control routine for stopping the motor of either the shift assisting apparatus for the front derailleur assembly or the motor for the front suspension assembly.
Figure 27:
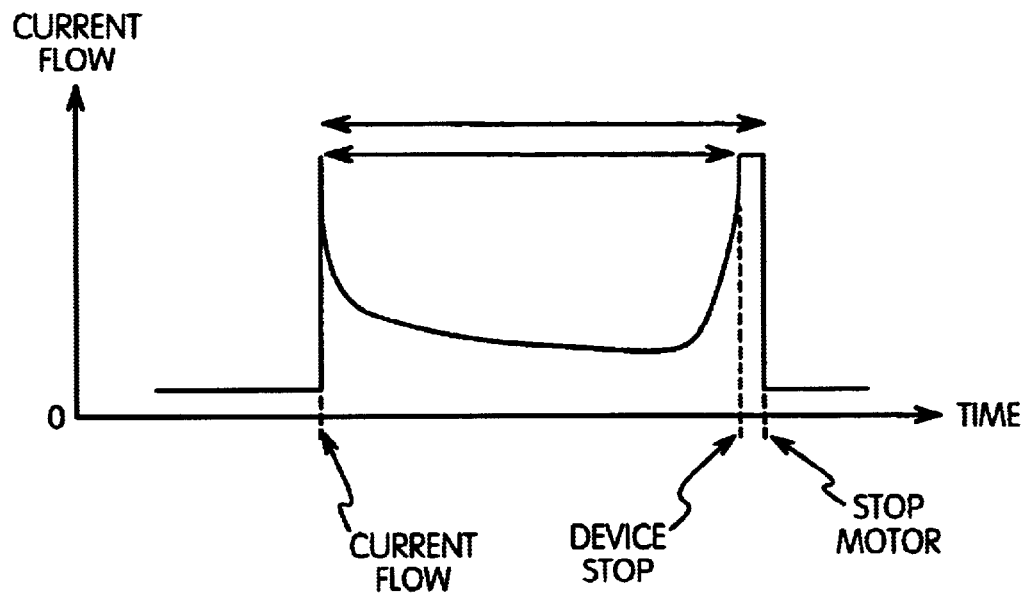
FIG. 27 is a graph illustrating the current flow to the motor versus time period of energization of the motor of either the front derailleur assembly or the front suspension assembly, when the overcurrent is used to stop the device.
Figure 28:
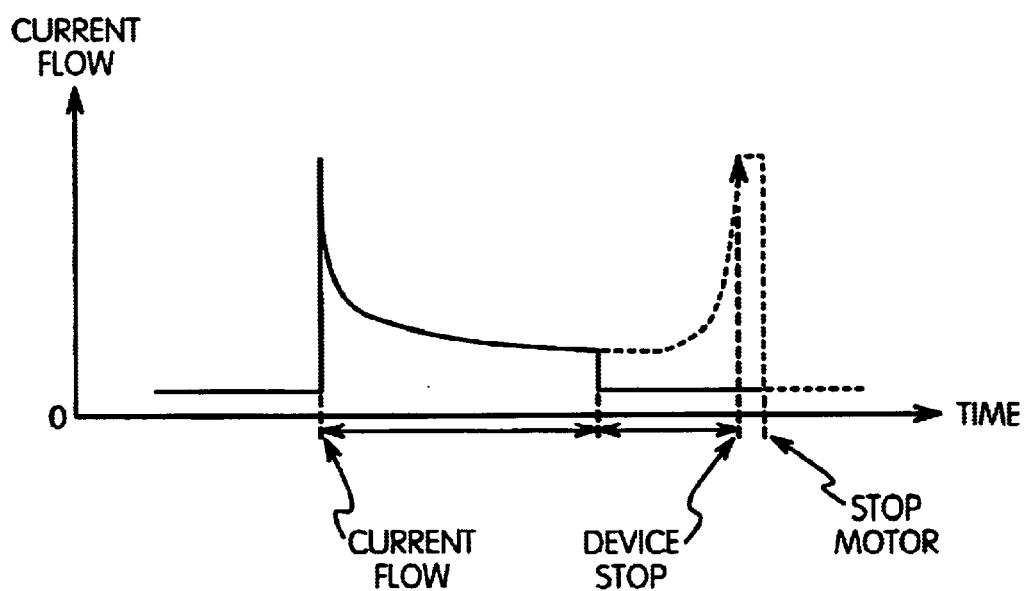
FIG. 28 is a graph illustrating the current flow to the motor versus time period of energization of the motor of either the front derailleur assembly or the front suspension assembly when the motor is stop after a predetermined period but before an overcurrent occurs.

Referring now to FIGS. 26–28, an alternative method of controlling the motors 72 and/or 72' will now be discussed. In this alternative embodiment, the overcurrent detecting circuit 84 or 84' is not used every time to control the stopping of the motors 72 or 72'.

Rather, the overcurrent detecting circuit 84 or 84' is only utilized one time for every one hundred shifts or suspension adjustments. In this method the microprocessor 80 or 82' measures the time period that the motor 72 or 72' is energized until an overcurrent occurs. This time period of energization is then utilized to calculate an energization time A for future shifts or suspension adjustments. Preferably, the time period of energization A for subsequent shifts or suspension adjustments is less than the time of the initial energization in which an overcurrent was utilized to stop the motor 72 or 72'. More specifically, the time period of energization A should be shorter than the measured time period that the motor 72 or 72' is energized until an overcurrent occurs, because the motor 72 or 72' will continue to move after the electricity is shut off due to the inertia of the motor 72 or 72'. Accordingly, the inertia can be utilized to complete the movement of the derailleur 28 or the control disc 61'. Since the stopping position or stopping timing will change due to the changing of motor load, temperature, battery power, etc., after a certain predetermined period, the microprocessor 80 or 80' will again measure the time between starting the motor 72 or 72' and an overcurrent, (for example one time for every hundred shifts or suspension adjustments) and then use this time to calculate a new time period of energization A for future adjustments.

The motor 72 or 72' is controlled according to the program illustrated in FIG. 26. In other words, the first time electronic control system 31' energizes the motors 72' which in turn causes the derailleur 28 to move or the control disk 61 of each of the cylinders 50' to rotate. Once the derailleur 28 or the control disk 61' reaches an end position, the derailleur 28 or the control disk 61' stops and the motor 72 or 72' locks.

The locking of the motor 72 or 72' causes an overcurrent to occur such that the overcurrent detecting circuit 84 or 84' stops the motor 72 or 72'.

The next time the motor 72 or 72' are energized, the motor 72 or 72' is energized for a shorter period of time which is calculated from measuring time that the motor 72 or 72' is energized until an overcurrent occurs. The motor 72 or 72' will be energized for the time period of energization A, which will stop the motor 72 or 72' before the derailleur 28 or the control disk 61' reaches an end position. Thus, no overcurrent will occur in the motor 72 or 72'. Since the motor 72 or 72' cannot stop immediately because of inertia, the derailleur 28 or the control disk 61' will continue to move to the end position under the power of inertia from the motor 72 or 72'. This will save battery energy as well as protect the parts of the device be controlled. As mentioned above, the stopping position or stopping timing will change due to the changing of motor load, temperature, battery power, etc., after a certain predetermined period. Thus, the microprocessor 80 or 80' will again measure the time between starting the motor 72 or 72' and an overcurrent, (for example one time for every hundred shifts or suspension adjustments) and then use this measured time period to calculate a new time period of energization A for future adjustments.

The terms of degree such as "substantially", "about" and "approximately" as used herein mean a reasonable amount of deviation of the modified term such that the end result is not significantly changed. These terms should be construed as including a deviation of at least±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. For example, the drive projections also may be formed directly on the lateral side wall or the outer peripheral surface of the crank axle mounting bosses and project laterally inwardly. The size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention is not limited to the disclosed embodiments.

What is claimed is:

1. A method of controlling a motor of a bicycle assembly, comprising:
   supplying current to said motor to move a bicycle component between a first position and a second position;
   monitoring current to said motor during movement of said bicycle component;
   stopping current to said motor to complete an operation of said bicycle component upon detection of an initial overcurrent to said motor due to said bicycle component reaching one of said first and second positions after being driven from the other of said first and second positions;
   measuring time between said supplying current to said motor and stopping current to said motor;
   determining a time period of energization; and
   energizing said motor for said time period to move said bicycle component between said first and second positions to complete a subsequent operation of said bicycle component after said detection of said initial overcurrent to said motor.

2. A method of controlling a motor of a bicycle assembly, comprising:
   supplying current to said motor to move a bicycle component between a first position and a second position;
   monitoring current to said motor during movement of said bicycle component;
   stopping current to said motor to complete an operation of said bicycle component upon detection of an initial overcurrent to said motor due to said bicycle component reaching one of said first and second positions after being driven from the other of said first and second positions;
   measuring time between said supplying current to said motor and stopping current to said motor;
   determining a time period of energization;
   energizing said motor for said time period to move said bicycle component between said first and second positions to complete a subsequent operation of said bicycle component after said detection of said initial overcurrent to said motor; and
   stopping use of said time period of energization to start and stop said motor, and supplying current to said motor until detection of a subsequent overcurrent in said motor due to said bicycle component reaching one of said first and second positions after being driven from the other of said first and second positions.

3. The method according to claim 2, further comprising repeating said energizing said motor for said time period to move said bicycle component between said first and second positions to complete a predetermined number of additional operations of said bicycle component after said initial overcurrent to said motor before said stopping use of said time period of energization to start and stop said motor.

4. The method according to claim 3, further comprising counting said predetermined number of said additional operations of said bicycle component to determine when to stop use of said time period of energization to start and stop said motor.

5. The method according to claim 1, wherein said bicycle component is a derailleur assembly.

6. The method according to claim 5, further comprising operating said motor to actuate a shift assisting apparatus that is operatively coupled between said derailleur assembly and a portion of a drive train such that movement of said derailleur assembly is powered by said drive train.

7. The method according to claim 1, wherein said bicycle component is a suspension assembly.

8. A bicycle assembly, comprising:
   a motor having an overcurrent detecting circuit operatively coupled to a power input line of said motor to interrupt current flow to said motor upon detection of an overcurrent, said overcurrent detecting circuit comparing voltage in said power input line with a reference voltage to determine when said overcurrent occurs in said motor; and
   a bicycle component operatively coupled to said motor to move said bicycle component back and forth between a first predetermined position and a second predetermined position such that said overcurrent occurs in said motor when said bicycle component reaches said first predetermined position after being driven from said second predetermined position and said overcurrent occurs when said bicycle component reaches said second predetermined position after being driven from said first predetermined position.

9. A bicycle assembly, comprising:

a motor having an overcurrent detecting circuit operatively coupled to a power input line of said motor to interrupt current flow to said motor upon detection of an overcurrent, said overcurrent detecting circuit comparing voltage in said power input line with a reference voltage to determine when said overcurrent occurs in said motor; and a derailleur assembly operatively coupled to said motor to move said derailleur assembly between a first position and a second position such that said overcurrent occurs in said motor when said derailleur assembly reaches one of said first and second positions after being driven from the other of said first and second positions.

10. The bicycle assembly according to claim 8, wherein said motor is a reversible motor.

11. The bicycle assembly according to claim 10, further comprising a shift control unit electrically coupled to said motor.

12. The bicycle assembly according to claim 11, wherein said shift control unit includes a shift device operatively coupled to said motor.

13. The bicycle assembly according to claim 12, wherein said bicycle component includes a derailleur assembly.

14. The bicycle assembly according to claim 13, wherein said derailleur assembly includes a front derailleur and a shift assisting apparatus operatively coupled to said front derailleur.

15. A bicycle assembly, comprising: a motor having an overcurrent detecting circuit operatively coupled to a power input line of said motor to interrupt current flow to said motor upon detection of an overcurrent, said overcurrent detecting circuit comparing voltage in said power input line with a reference voltage to determine when said overcurrent occurs in said motor; and a suspension assembly operatively coupled to said motor to move said suspension assembly between a first position and a second position such that said overcurrent occurs in said motor when said suspension assembly reaches one of said first and second positions after being driven from the other of said first and second positions.

16. A bicycle assembly, comprising:

a motor having an overcurrent detecting circuit operatively coupled to a power input line of said motor to interrupt current flow to said motor upon detection of an overcurrent, said overcurrent detecting circuit comparing voltage in said power input line with a reference voltage to determine when said overcurrent occurs in said motor; and a bicycle component having a first part operatively coupled to said motor to move said first part of said bicycle component back and forth within a predetermined range of movement between a first predetermined position and a second predetermined position, said first part of said bicycle component being configured and arranged relative to at least a second part of said bicycle component that limits movement of said first part such that said overcurrent occurs in said motor when said bicycle component reaches one of said first and second predetermined positions after being driven from the other of said first and second predetermined positions.

17. The bicycle assembly according to claim 16, wherein said bicycle component includes a derailleur assembly.

18. The bicycle assembly according to claim 16, wherein said motor is a reversible motor.

19. The bicycle assembly according to claim 18, further comprising a shift control unit electrically coupled to said motor.

20. The bicycle assembly according to claim 19, wherein said shift control unit includes a shift device operatively coupled to said motor.

21. The bicycle assembly according to claim 20, wherein said bicycle component includes a derailleur assembly.

22. The bicycle assembly according to claim 21, wherein said derailleur assembly includes a front derailleur and a shift assisting apparatus operatively coupled to said front derailleur.

23. The bicycle assembly according to claim 16, wherein said bicycle component is a suspension assembly.

24. The bicycle assembly according to claim 9, wherein said motor is a reversible motor, in which a direction of said motor is controlled by a shift control unit that is electrically coupled to said motor.

* * * * *